US007945631B2

(12) United States Patent
Chkodrov et al.

(10) Patent No.: US 7,945,631 B2
(45) Date of Patent: May 17, 2011

(54) MESSAGE STATE MAINTENANCE AT A CURSOR

(75) Inventors: Gueorgui Chkodrov, Redmond, WA (US); Richard D. Hill, Kirkland, WA (US); Craig A. Critchley, Fall City, WA (US); Krishnan Srinivasan, AndraPradesh (IN); Tihomir Tarnavski, Redmond, WA (US); Mitchell G. Morris, Sammamish, WA (US); Pramod Gurunath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 12/263,891

(22) Filed: Nov. 3, 2008

(65) Prior Publication Data
US 2009/0132671 A1 May 21, 2009

Related U.S. Application Data

(60) Provisional application No. 60/988,735, filed on Nov. 16, 2007.

(51) Int. Cl.
*G06F 15/16* (2006.01)
(52) U.S. Cl. ..................................................... 709/206
(58) Field of Classification Search .................. 709/204, 709/206; 707/609, 687, 694, 705, 713, 790, 707/791, 801, 802, 803; 714/43, 40, 25, 714/1, 100
See application file for complete search history.

(56) References Cited

U.S. PATENT DOCUMENTS

| 5,377,350 | A | 12/1994 | Skinner |
| 5,465,251 | A | 11/1995 | Judd et al. |
| 5,786,771 | A | 7/1998 | Feeney et al. |
| 5,819,272 | A | 10/1998 | Benson |
| 5,826,269 | A | 10/1998 | Hussey |
| 5,870,556 | A | 2/1999 | Cote et al. |
| 5,872,930 | A | 2/1999 | Masters et al. |
| 5,951,648 | A | 9/1999 | Kailash |
| 5,951,695 | A | 9/1999 | Kolovson |
| 6,058,389 | A | 5/2000 | Chandra et al. |
| 6,205,498 | B1 | 3/2001 | Habusha et al. |
| 6,230,156 | B1 | 5/2001 | Hussey |
| 6,256,634 | B1 | 7/2001 | Moshaiov et al. |

(Continued)

FOREIGN PATENT DOCUMENTS
WO 9511560 4/1995

(Continued)

OTHER PUBLICATIONS

Lazar, Sashi; Weerakoon, Ishan; and Sidhu, Deepinder; "A Scalable Location Tracking and Message Delivery Scheme for Mobile Agents," Procceedings Seventh IEEE International Workshops on Enabling Technologies: Infrastructure for Collaborative Enterprises (WET ICE '98), Jun. 17-19, 1998, pp. 243-248.

(Continued)

*Primary Examiner* — William C Vaughn, Jr.
*Assistant Examiner* — Scott Christensen
(74) *Attorney, Agent, or Firm* — Workman Nydegger

(57) ABSTRACT

The present invention extends to methods, systems, and computer program products for maintaining message state at a cursor. A message consumer requests messages from a cursor. The cursor can maintain state information for the message consumers separately from a message log that stores messages. Any of a variety of message delivery assurances can be used when delivering a message to a message consumer.

20 Claims, 10 Drawing Sheets

U.S. PATENT DOCUMENTS

| | | | |
|---|---|---|---|
| 6,298,455 B1* | 10/2001 | Knapman et al. | 714/43 |
| 6,336,135 B1 | 1/2002 | Niblett | |
| 6,339,794 B2 | 1/2002 | Bolosky et al. | |
| 6,446,144 B1 | 9/2002 | Habusha et al. | |
| 6,446,206 B1 | 9/2002 | Feldbaum | |
| 6,466,987 B2 | 10/2002 | Bolosky et al. | |
| 6,662,206 B1* | 12/2003 | Banavar et al. | 709/201 |
| 6,772,216 B1 | 8/2004 | Ankireddipally et al. | |
| 6,816,458 B1 | 11/2004 | Kroon | |
| 6,877,107 B2 | 4/2005 | Giotta et al. | |
| 6,970,945 B1 | 11/2005 | Berkman et al. | |
| 6,980,518 B1 | 12/2005 | Sun et al. | |
| 7,020,697 B1 | 3/2006 | Goodman et al. | |
| 7,050,432 B1 | 5/2006 | Banavar et al. | |
| 7,162,512 B1* | 1/2007 | Amit et al. | 709/206 |
| 7,162,524 B2 | 1/2007 | Astley et al. | |
| 7,181,482 B2 | 2/2007 | Jain et al. | |
| 7,203,706 B2 | 4/2007 | Jain et al. | |
| 7,254,616 B1 | 8/2007 | Ennis et al. | |
| 7,287,066 B2 | 10/2007 | Ruggaber et al. | |
| 7,525,964 B2 | 4/2009 | Astley | |
| 7,536,436 B2 | 5/2009 | Kakivaya | |
| 7,536,587 B2 | 5/2009 | Vertes | |
| 7,631,214 B2 | 12/2009 | Bockhold | |
| 7,640,357 B2* | 12/2009 | Kirov et al. | 709/233 |
| 2001/0032232 A1 | 10/2001 | Zombek et al. | |
| 2002/0004812 A1 | 1/2002 | Motoyama | |
| 2002/0123966 A1 | 9/2002 | Chu | |
| 2003/0005117 A1 | 1/2003 | Kang et al. | |
| 2003/0041139 A1* | 2/2003 | Beadles et al. | 709/223 |
| 2003/0110314 A1 | 6/2003 | Barnes | |
| 2004/0111652 A1 | 6/2004 | Shoaib et al. | |
| 2004/0136325 A1 | 7/2004 | Dobric et al. | |
| 2004/0139166 A1 | 7/2004 | Collison | |
| 2004/0205124 A1 | 10/2004 | Limprecht et al. | |
| 2004/0205781 A1 | 10/2004 | Hill et al. | |
| 2005/0021622 A1 | 1/2005 | Cullen | |
| 2005/0138112 A1 | 6/2005 | Sagar et al. | |
| 2005/0289414 A1 | 12/2005 | Adya | |
| 2006/0036679 A1 | 2/2006 | Goodman et al. | |
| 2006/0037069 A1 | 2/2006 | Fisher | |
| 2006/0136256 A1 | 6/2006 | Roots et al. | |
| 2006/0146991 A1 | 7/2006 | Thompson et al. | |
| 2006/0168052 A1 | 7/2006 | Srinivasan | |
| 2007/0156808 A1 | 7/2007 | Koegel et al. | |
| 2007/0174233 A1 | 7/2007 | Ginis et al. | |
| 2007/0245018 A1 | 10/2007 | Bhola et al. | |
| 2007/0266392 A1 | 11/2007 | Thoelke | |
| 2008/0209007 A1 | 8/2008 | Gurecki | |
| 2009/0064182 A1 | 3/2009 | Holar | |

FOREIGN PATENT DOCUMENTS

| | | |
|---|---|---|
| WO | 0041365 | 7/2000 |
| WO | 2009037685 A1 | 3/2009 |

OTHER PUBLICATIONS

Brzezinski, Jerzy; Kobusinska, Anna; and Kobusinski, Jacek; "Reliable Services for Distributed Environment," Proceedings International Conference on Parallel and Distributed Processing Techniques and Applications, Jun. 26-29, 2000, vol. V, pp. 2667-2673.

Horrell, Simon; "Microsoft Message Queue (MSMQ)," Enterprise Middleware, Jun. 1999, pp. 25-35.

Al-Jaber, Hessa and Rotenstreich, Shmuel; The Cascade Fault Tolerance Message System,: Seventeenth Annual ACM Computer Science Conference, Feb. 21-23, 1989, pp. 252-259.

Kausar, Nadia and Crowcroft, Jon; "End to End Reliable Multicast Transport Protocol Requirements for Collaborative Multimedia Systems," Proceedings Seventeenth IEEE Symposium on Reliable Distributed Systems, Oct. 20-23, 1998, pp. 425-430.

Kung, Roberto and Shacham, Nachum; "A Distributed Algorithm for Reliable Message Delivery Over a Sub-Network," GLOBECOM'87 IEEE/IEICE Global Telecommunications Conference 1987, Nov. 15-18, 1987, vol. 1, pp. 193-198.

Tai, Stephen; Mikalsen, Thomas; Rouvellou, Isabelle; Sutton, Stanley M. Jr.; "Conditional Messaging: Extending Reliable Messaging with Application Conditions," Proceedings 22nd International Conference on Distributed Computing Systems, Jul. 2-5, 2002, pp. 123-132.

Al-Jaber, Hessa and Rotenstreich, Shmuel, "Reliable Message Delivery Without Hard Backups," International Journal of Mini and Microcomputers, 1992, vol. 14, No. 3, pp. 117-124.

Jim Gray & Andreas Reuter, Transaction Processing: Concepts and Techniques (Bruce M. Spatz ed., Morgan Kaufmann Publishers, Inc. 1993).

Bilorusets, Ruslan, et al. Web Services Reliable Messaging Protocol (WS-ReliableMessaging) BEA, IBM, Microsoft and TIBCO Software, Mar. 13, 2003.

IBM, "Method of enabling automated invocation of web services", Research Disclosure, Mason Publishing, Mar. 2002.

Office Action for U.S. Appl. No. 10/401,649 mailed Mar. 3, 2008.

Office Action for U.S. Appl. No. 10/401,649 mailed Aug. 11, 2008.

Eugster, Patrick Th., et al., "The Many Faces of Publish/Subscribe", ACM Computing Surveys, vol. 35, No. 2, Jun. 2003, pp. 114-131.

Joshi, Rajive, Real-Time Innovations, Inc., Embedded.com, "Building a effective real-time distributed publish-subscribe framework Part 1", Aug. 2006, 6 pages.

Slama, Dirk, et al., "Service Oriented Architecture: Inventory of Distributed Computing Concepts", Dec. 2004, 5 pages.

Bhola, Sumeer, et al., "Exactly-Once Delivery in a Content-Based Publish-Subscrbe System", 2002, 10 pages.

Bhola, Sumeer, et al., "Scalably Supporting Durable Subscriptions in a Publish/Subscribe System", Proceedings of the 2003 International Conference on Dependable Systems and Networks (DSN '03), 2003 IEEE, 10 pages.

Datasheet, "Sun Java System Message Queue Enterprise Edition", 2003, 6 pages.

ORACLE9i Application Developer's Guide—Fundamentals, Release 2 (9.2), Part No. A96590-01, "Using the Publish-Subscribe Model for Applications", 2002, 8 pages.

Corsaro, Angelo, et al., "Quality of Service in Publish/Subscribe Middleware", IOS Press 2006, 19 pages.

Eugster, Patrick, et al., "Distributed Asynchronous Collections: Abstractions for Publish/Subscribe Interaction", 2000, 33 pages.

Hu, Songlin, et al., "Client Mobility in Distributed Content-Based Publish/Subscribe Systems", MSRG Technical Report, University of Toronto, Nov. 2007, 12 pages.

Zhao, Yuanyuan, et al., "Subscription Propagation in Highly-Available Publish/Subscribe Middleware", 2004, 20 pages. (Copy Attached).

Wikipedia, "Microsoft Message Queuing", 2009, 3 pages. (Copy Attached).

Orbix, "OrbixTalk MessageStore", 2002, 4 pages. (Copy Attached).

Johnson, Sender-Based Message Logging, 1987, 6 pages. (Copy Attached).

Office Action dated Dec. 8, 2008 cited in U.S. Appl. No. 10/401,649 (Copy Attached).

Notice of Allowance dated Jun. 11, 2009 cited in U.S. Appl. No. 10/401,649 (Copy Attached).

U.S. Appl. No. 10/401,649, Nov. 4, 2009, Notice of Allowance.

U.S. Appl. No. 12/263,878, filed Sep. 24, 2010, Office Action.

U.S. Appl. No. 12/263,878, filed Jan. 7, 2011, Notice of Allowance.

* cited by examiner

MESSAGE STATE MAINTENANCE AT A CURSOR

CROSS-REFERENCE TO RELATED APPLICATIONS

This application claims the benefit of U.S. Provisional Patent Application No. 60/988,735, entitled "STORAGE FOR DISTRIBUTED MESSAGE SYSTEMS", filed on Nov. 16, 2007, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Distributed messaging systems can implement queuing and publish/subscribe ("pub/sub") message patterns. A queue is essentially a one-to-one consumer message exchange. A message producer inserts a message into the queue and a message consumer takes the message out of the queue. On the other hand, a pub/sub system is a one-to-many message exchange. A message producer publishes a message and multiple message consumers subscribe to and receive the published message.

Distributed messaging systems, including those that implement queuing and pub/sub patterns, are typically backed by a message store. In these distributed messaging systems, the state of individual consumers who subscribe for messages from a topic or who consume from a queue is collocated with the message store. Consumers (e.g., user code applications) typically use distributed messaging systems to ensure that the message is delivered exactly once from the message log to the consumer. Consumers use distributed transactions, for example, implementing a transaction across a Wide Area Network, to retrieve messages because application state is inherently tied with the cursor state. Unfortunately, the use of collocated user state and message store and inter-network distributed transactions does not scale for large numbers of consumers receiving messages from a queue or topic for at least a number of different reasons.

Since user state is collocated with the message store, the resource capabilities of the message store limit the amount of user state that can be simultaneously maintained, which correspondingly limits the number of consumers that can simultaneously interact with the message store. Further, transactions are resource intensive operations, require participants to wait on other participants, and require computer systems to keep in-memory state (e.g., locks). Thus, the resources of the message store and/or communication medium can limit the number of simultaneous transactions that are possible for the message log. Further, implementing transactions across a network consumes a significant amount of bandwidth and can negatively impact other types of communication on the network.

BRIEF SUMMARY

The present invention extends to methods, systems, and computer program products for maintaining message state at a message cursor. In some embodiments, the cursor updates message state after a message consumer processes a message. The cursor receives a request for a message from a message consumer. In response to receiving the request, the cursor refers to a current read sequence number. The current read sequence number corresponds to the last message that the cursor returned to the message consumer. Also in response to receiving the request, the cursor sends a request for a next message to a message log. The request includes the current read sequence number so as to indicate to the message log that the cursor is requesting a message with a sequence number greater than the current read sequence number.

The cursor receives a new message and a next sequence number from the message log. The next sequence number corresponds to the new message within the message log. The next sequence number is a sequence number after the current sequence number that corresponds to a message. The cursor delivers the new message to the message consumer and sets its read sequence number to the next sequence number Optionally, the cursor receives a deletion request from the message consumer. The deletion request requests deletion of a message by sequence number. The cursor keeps internal state about which messages are deleted. When the cursor detects deletion of a continuous range of messages deletions, it updates the current delete sequence number to the maximum number so that all messages with sequence numbers less than the maximum number are considered deleted.

In other embodiments, a cursor maintains message state when messaging operations temporarily fail during delivery of a message. It is detected that messaging operations have failed at the cursor or the message consumer prior to updating a current sequence number to the value of a next sequence number. It is determined that messaging operations have returned at the cursor or message consumer subsequent to the messaging operations failing.

The cursor receives an additional request for a message from the message consumer subsequent to messaging operations returning. The cursor again sends the new message to the message consumer in response to the additional request. Sending the new message again can include: sending another request to the message log, receiving the new message from the message log, and delivering the message to the message consumer. The cursor receives a deletion request from the message consumer. The deletion request requests deletion of the new message. The cursor updates the current sequence number to the value of the next sequence number in response to the deletion request.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
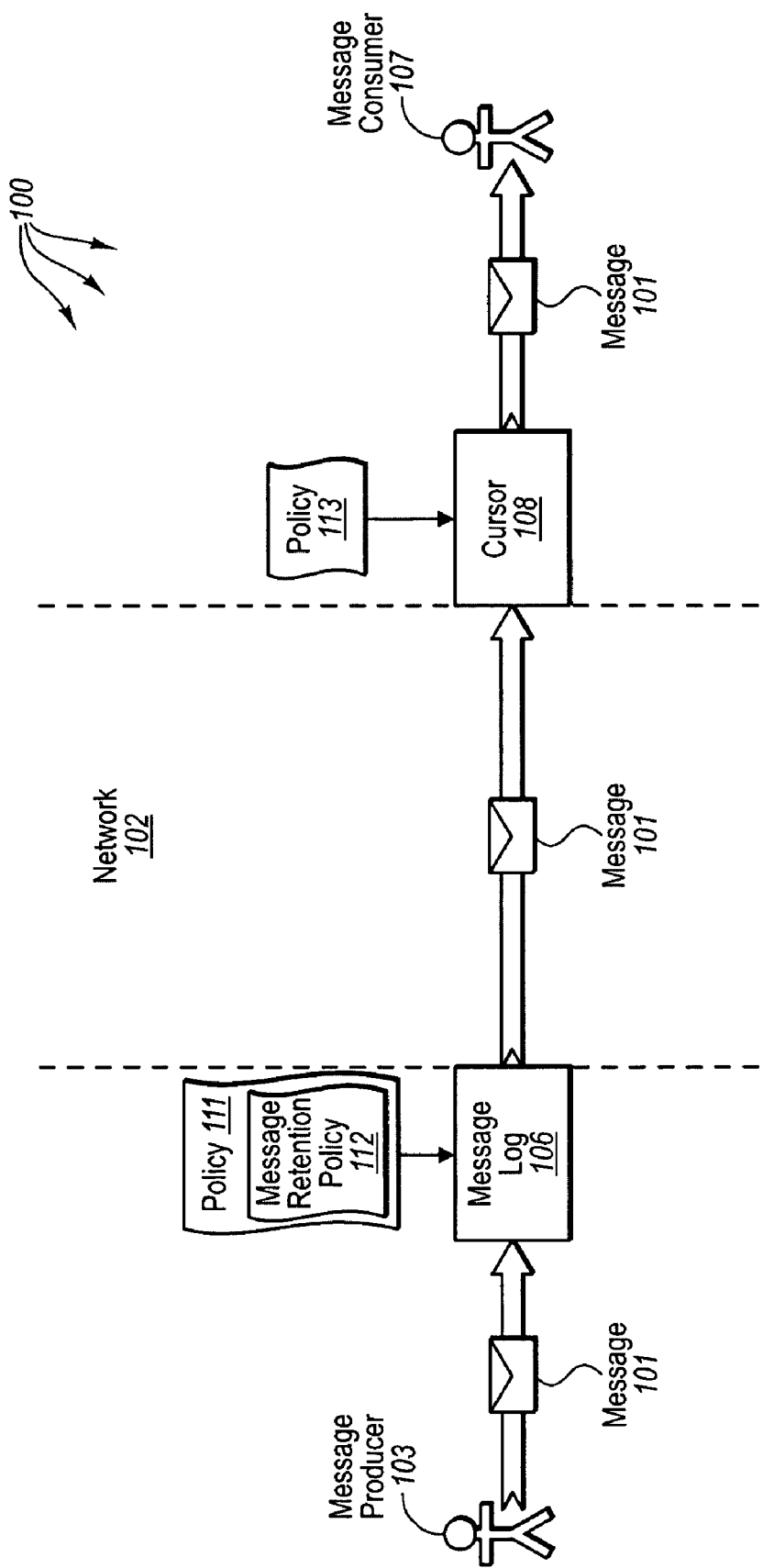
FIG. 1 illustrates an example computer architecture that facilitates message state maintenance in a componentized messaging system.

The present invention extends to methods, systems, and computer program products for maintaining message state at a message cursor. In some embodiments, the cursor updates message state after a message consumer processes a message. The cursor receives a request for a message from a message consumer. In response to receiving the request, the cursor refers to a current read sequence number. The current read sequence number corresponds to the last message that returned to the consumer. Also in response to receiving the request, the cursor sends a request for a next message to a message log. The request includes the current read sequence number so as to indicate to the message log that the cursor is requesting a message with a sequence number greater than the current reads sequence number.

The cursor receives a new message and a next sequence number from the message log. The next sequence number corresponds to the new message within the message log. The next sequence number is a sequence number after the current sequence number that corresponds to a message. The cursor delivers the new message to the message consumer and sets its read sequence number to the next sequence number.

In some embodiments, the cursor also stores its read sequence number in durable storage. When a read sequence number in durable storage, a consumer crash immediately receiving a message is essentially equivalent to a lost message. As such, this provides an at most once assurance.

To support other assurances, the cursor does not update its state until the consumer indicates that it is done processing a message. The cursor receives a deletion request from the message consumer. The deletion request requests deletion of a message by sequence number. The cursor marks in its internal memeory the fact that the message has been deleted. When the cursor detects deletion of a continuous range of messages deletions, it updates the current delete sequence number to the maximum number so that all messages with sequence numbers less than the maximum number are considered deleted.

In other embodiments, a cursor maintains message state when messaging operations temporarily fail during delivery of a message. It is detected that messaging operations have failed at the cursor or the message consumer prior to updating a current sequence number to the value of a next sequence number. It is determined that messaging operations have returned at the cursor or message consumer subsequent to the messaging operations failing.

The cursor receives an additional request for a message from the message consumer subsequent to messaging operations returning. The cursor again sends the new message to the message consumer in response to the additional request. Sending the new message again can include: sending another request to the message log, receiving the new message from the message log, and delivering the message to the message consumer. The cursor receives a deletion request from the message consumer. The deletion request requests deletion of the new message. The cursor updates the current sequence number to the value of the next sequence number in response to the deletion request.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transfer of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 facilitates message state maintenance in a componentized messaging system. As depicted, computer architecture 100 includes message producer 103 (e.g., a message producing application), message log 106, network 102, cursor 108, and message consumer 107 (e.g., a message consuming application). Each of the depicted computer systems can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol ("SOAP"), etc.) over the network.

Generally, message log 106 (e.g., message storage for a queue or pub/sub environment) captures messages (e.g., message 101) from message producer 103 (e.g., for delivery to message consumers). Message producer 103 and message log 106 can interoperate to store messages (in volatile and/or durable storage) at message log 106. Thus, message log 106 can provide either queue or publish/subscribe functionality. A queue is essentially a one producer-to-one consumer message exchange. A message producer inserts a message into the queue (e.g., message log 106) and a message consumer takes the message out of the queue. On the other hand, a publish/subscribe system is a one producer-to-many consumers message exchange. A message producer publishes a message (e.g., to message log 106) and multiple message consumers subscribe to and receive the published message.

Message log 106 can be configured in accordance with policy 111. Policy 111 can indicate how message log 106 is to be configured. For example, policy 111 can indicate components within message log 106 that are to be activated or deactivated. Combinations of components can be activated and deactivated to provide specified message assurances, such as, for example, best effort, at most once, at least once, and exactly once, when message log exchanges messages with other messaging components. For example, message provider 103 and components of message log 106 can interoperate to implement a capture protocol for capturing messages from message provider 103 in message log 106. The capture protocol can provide message assurances, such as, for example, best effort or exactly once message assurances, that messages sent from message producer 103 are captured at message log 106.

Policy 111 also includes message retention policy 112. Message retention policy indicates conditions under which messages are to be retained in and/or removed from message log 106. For example, message retention policy 112 can indicate that messages are to be retained in accordance with a drop oldest policy. Under a drop oldest policy, a specified amount of storage space is allocated in message log 106 to store new messages. As long as space is available store new messages in message log 106, existing messages are retained in message log 106. On the other hand, when insufficient storage space is available in message log 106 to store a new message, one or more older (or oldest) messages are dropped from message log 106 to free up storage space for the new message.

Message retention policy 112 can indicate that messages are to be retained until the messages are acknowledged. Under a drop on acknowledge policy, storage space can be dynamically allocated as needed to store new messages. When insufficient storage space is available in message log 106 to store a new message, message log 106 can wait, thereby slowing down or return an error to the producer. When message log 106 receives an acknowledgement of one or more messages, any of the one or more messages stored in message log 106 can be dropped freeing up storage space for new messages.

A combination of a specified amount of storage and drop on acknowledged message retention policies can also be used together, for example, to insure that resource allocation to message log 106 is dynamic yet bounded. In this combination, when insufficient storage space is available in message log 106 to store a new message, the message log refuses to accept the new message and may return a fault message to the message producer. The message producer may retry the operation at a later time.

Message retention policies can be used with different combinations of activated and/or deactivated components to provide specified message assurances. For example, a drop oldest message retention policy can be used in combination with various components of message log 106 to provide best effort assurances to message consumers. On the other hand, a drop on acknowledged message retention policy can be used in combination with various components of message log to provide at least once assurance to message consumers.

Policy 111 can also indicate other behaviors that are to be implemented at message log 106. For example, when configured to provide drop on acknowledged message retention policy, after receiving an acknowledgement acknowledging receipt of one or more messages, message log 106 disregards further acknowledgements acknowledging any of the one or more messages.

For example, if message log 106 receives an acknowledgement of all messages with an ID of <20 (e.g., from cursor 108), message log 106 ignores a subsequently received acknowledgement of all messages <17 (e.g., from receiving cursor 108). Thus, message log 106 can implement an at most once behavior for message acknowledgments. This results in idempotence at message log 106 for received acknowledgments.

Generally, cursor 108 is configured to provide messages (e.g., message 101) to message consumer 107. Cursor 108 and message consumer 107 can interoperate to request messages for and deliver messages to message consumer 107. Cursor 108 can deliver messages to message consumer in either a queued or publish/subscribe (and potentially competitive) messaging environment.

Cursor 108 can be configured in accordance with policy 113. Policy 113 can indicate how cursor 108 is to be configured. For example, policy 113 can indicate components within cursor 108 that are to be activated or deactivated. Combinations of components can be activated and deactivated to provide specified message assurances, such as, for example, best effort, at most once, at least once, and exactly once, when cursor 108 exchanges messages with other messaging components. For example, message consumer 107 and components of cursor 108 can interoperate to implement a delivery protocol for delivery of messages to message consumer 107. The delivery protocol can provide message assurances, such as, for example, at most once, at least once, or exactly once message assurances, that messages received at cursor 108 are delivered to message consumer 107.

Policy 113 can also indicate other behaviors that are to be implemented at cursor 108. For example, to implement idempotence, cursor 108 can be configured with a duplicate detection algorithm that detects duplicate copies of a message. Thus, after receiving a message, cursor 108 can be configured to disregard any duplicate copies of the message. Thus, cursor 108 can implement an at most once behavior for messages. This results in idempotence at cursor 108 for received messages.

As depicted, message log 106 and cursor 108 are connected to network 102. Generally, message log 106 and cursor 108 can interoperate to transfer messages from message log 106 to cursor 108. Policy 111 and policy 113 can specify various components of message log 106 and cursor 108 respectively that are to be activated and/or deactivated to provide specified message assurances when messages are transferred from message log 106 to cursor 108. For example, message log 106 and cursor 108 can interoperate to implement a transfer protocol for transferring messages from message log 106 to cursor 108. The transfer protocol can provide message assurances, such as, for example, at most once and at least once message assurances, that requested messages are transferred from message log 106 to cursor 108.

In some embodiments, message producer 103 and message log 106 are collocated on a computer system or local area network. Similarly, cursor 108 and message consumer 107 can be collocated on a different computer system or local area network. Network 102 separates the computer systems and/or LANs from one another.

Figure 2:
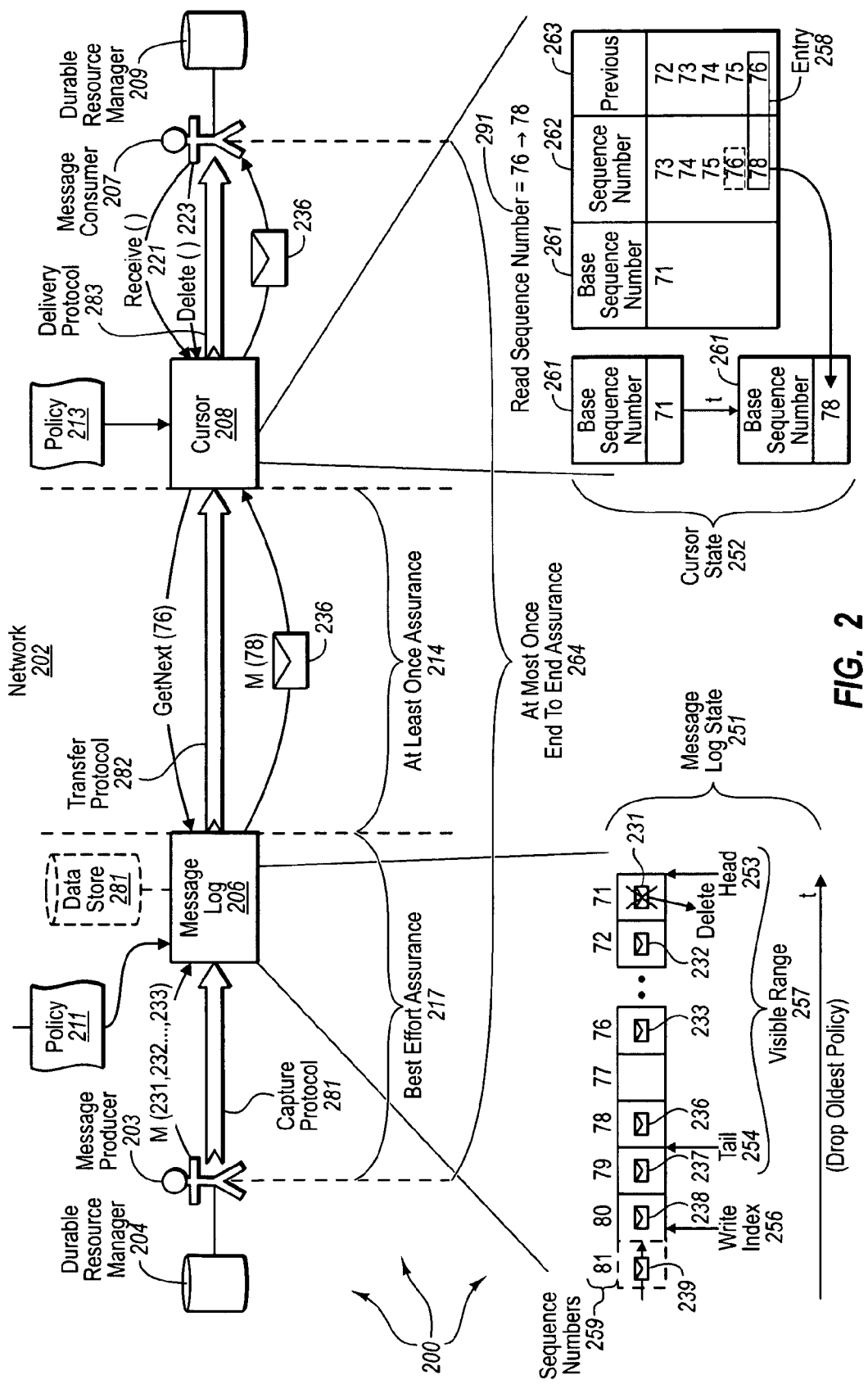
FIG. 2 illustrates an example computer architecture that facilitates message state maintenance in a componentized messaging system that provides at most once end to end message assurances.

FIG. 2 illustrates an example computer architecture 200 that facilitates message state maintenance in a componentized messaging system that provides best effort end to end message assurances. As depicted, computer architecture 200 includes durable storage 204, message producer 203 (e.g., a message producing application), message log 206, network 202, cursor 208, message consumer 207 (e.g., a message consuming application), and durable storage 209.

Policy 211 indicates behaviors for message log 206 and components that are to be activated and/or deactivated to implement capture protocol 281. Policy 211 can indicate to message log 106 that it is to use a drop oldest message retention policy. Policy 211 can also indicate that message log 206 is to use volatile and/or durable storage for storing messages captured from message producer 203. Policy 211 can also indicate that message log 206 is to use volatile and/or durable storage for storing message log state 251. Message log 206 can store messages in data store 281 when durable storage is indicated. When durable storage is used, successfully captured messages and/or message log state 251 can survive system restarts at message log 206.

Capture protocol 281 can provide a best effort assurance 217 that messages from message producer 203 are captured in message log 206. That is, messages sent from message producer 203 are captured at message log 206 at most once. Any messages successfully captured at message log 206 can be accepted for writing.

Message log state 251 represents the state of message log 206. Message log state maintains (e.g., monotonically increasing) sequence numbers 259 and associations to corresponding messages. Message log state 251 is updated, when message log 206 accepts a new message for writing.

When message log 206 receives a message, it can accept the message for writing to message log 206. A message log writer can be used to write accepted messages into message log 206. The message log writer can refer to a reservation based policy for writes, included in policy 211. Thus, the message log writer can secure storage space for a message prior to writing message log state. The message log writer can use a resource gate to check for available storage space. For each accepted message, the message log writer computes the size of the message and requests to reserve space to store the message. When space is successfully reserved, the message log writer assigns a sequence number (e.g., monotonically increasing) to the accepted message.

After reserving storage space and assigning a sequence number, the message log writer attempts to write to the message log state. If the write succeeds, the reserved storage space is updated from reserved to used. On the other hand, if the write fails, the reserved storage space is updated from reserved to free.

If an attempted resource reservation determines that storage space is unavailable, a write can be queued until space becomes available. A quota can be used to regulate how many write requests can be simultaneously queued. Alternately, under a drop oldest message retention policy, older messages can be dropped until enough storage space is freed up to store the new message. For example, message 231 can be deleted to free up space for storing message 239. Head 253 can then be moved to precede sequence number 72.

A message log writer can allow for parallel writes to message store 206. Thus, it is possible for the log to know the outcome of writing messages with sequence numbers of greater value before the outcome of writing messages of sequence numbers of lesser value. However, the visibility of messages to cursor 208 can be limited to contiguous ranges of sequence numbers. For example, it may be that the outcome of writing a message with sequence number 2 is known by the log before a message with sequence number 1. However, the message with sequence number 2 is not made visible to cursor 208 until the outcome of the message with sequence number 1 is known. Limiting the visibility to contiguous ranges helps insure that messages are not read out of order.

Accordingly, the message log writer can use head 253, tail 254, and write index 256 to regulate the visibility of messages in message log state 251. Head 253 represents the beginning of message log state 251. Messages closer to head 253 are older messages that have been in message log state 251 for a longer period of time. Tail 254 represents a location in message log state 251 before which the status of message writes is known. That is, the success or failure of message writes for sequence numbers between head 253 and tail 254 (sequence numbers 71 through 78) is known. Thus, these sequence numbers, for example, visible range 257, are made visible to cursor 208. As the success or failure of additional messages is known, tail 254 can be moved back to higher sequence numbers.

Write index 256 represents the sequence number corresponding to the last message write attempt. Message writes between tail 254 and write index 256 may be in doubt (sequence numbers 79 through 81). A message write is in doubt when a sequence number is assigned and/or storage space is reserved, but it is undetermined if a write has yet succeeded or failed. The message log writer can keep track of the status of message write outcomes in memory. Upon detecting that outcome is known for a the message at tail 254, the message log writer updates message log state 251 by moving the location of tail 254 to the next lowest sequence number between tail 254 and write index 256 whose message write is still in-doubt. For example, assuming the outcome of writing message at sequence number 80 is known before the outcome of writing message at sequence number 79 is known, Tail 254 is not updated until the outcome of writing message at sequence number 79 is known, at which time tail 254 is updated to the position following message at sequence number 80.

Cursor state 252 represents the durable state of cursor 208. This includes a base sequence number 261, sequence numbers of deleted messages 262, and corresponding previous sequence numbers 263. Base sequence number 261 represents a low water mark of messages that message consumer 207 has consumed. For example, base sequence number 261 represents that message consumer 207 will never request any message sequence less than or equal to sequence number 71. Cursor state 252 is conceptually equivalent to a bitmask.

Any messages marked as deleted after sequence number 71 are tracked using sequence number 262 and previous 263. The use of both sequence number 262 and previous 263 facilitates compensating for holes in message log state 251. For example, entry 258 indicates that sequence number 78 was returned in response to a request for a message after sequence number 76. Thus, cursor state 252 reflects lack of a message (i.e., hole) corresponding to sequence number 77 in message log state 251. From time to time, when a contiguous range of sequence numbers is present in sequence number 262, cursor state 252 can be compacted by updating base sequence number 261 and removing data from sequence number 262 and previous 263. For example, base sequence number 261 can be updated to sequence number 78 and other entries deleted.

Policy 213 indicates behaviors for cursor 208 and components that are to be activated and/or deactivated to implement delivery protocol 283. Policy 213 can also indicate that cursor 208 is to use volatile and/or durable storage for cursor state 252. Cursor 208 can store cursor state 252 in a durable data store when durable storage is indicated. When durable storage is used, cursor state 252 can survive system restarts at cursor 208. Delivery protocol 283 can provide a best effort assurance when volatile storage is used to store cursor state 252. Delivery protocol 283 can provide an at most once assurance or an at least once assurance when durable storage is used to store cursors state 252. At most once assurance is provided when durable state is updated before delivering the message. At least once assurance is provided when durable state is updated after delivering the message.

Policy 211 and policy 213 can also indicate behaviors of and component activation/deactivation at message log 206 and cursor 208 respectively to implement transfer protocol 282. Transfer protocol 282 can provide at least once assurance 214.

To request a new message, message consumer 207 can send Receive( ) 221 to cursor 208. Receive( ) 221 can implement a protocol that non-destructively locks a next available message, reserving the next available message for message consumer 207. In response to Receive( ) 221, cursor 208 can refer to read sequence number 291 to determine the sequence number of last message it read from message log 206. For example, cursor 208 can determine that sequence number 76 was the last sequence number marked as deleted.

In response, cursor 208 can send GetNext(76) to message log 206. GetNext(76) is a read request for the next message after the message corresponding to sequence number 76. When message log 206 receives the read request, it refers to message log state 251 to identify the next sequence number after sequence number 76 that corresponds to a message. Since message sequence 77 does not correspond to a message (e.g., due to a failed write), message log 206 identifies sequence number 78 and corresponding message 236. Message log 206 sends sequence number 78 along with message 236 back to cursor 208.

Transfer protocol 282 provides an at least once assurance (except for when the quota of message log 206 is reached). The drop oldest message retention policy drops messages based on resource availability at message log 206 and/or message age. Thus, messages can be dropped between multiple sendings of the same read request. For example, if cursor 208 were to send GetNext(76) a further time, there is some possibility that sequence number 78 and message 236 have been dropped in accordance with the drop oldest message retention policy in the interim. As such, message log 206 can return a different message in response to the further GetNext (76).

Upon receiving sequence number 78 and message 236, cursor 208 sends message 236 to message consumer 207. During the course of delivery protocol 283, message consumer 207 can send Delete( ) 223. Delete( ) 223 instructs cursor 208 to delete message sequence number 78. In response to receiving Delete( ) 223, entry 258 can be inserted into cursor state 252. Cursor 208 can also update read sequence number 291 to 78. Thus, a subsequent Receive( ) request after updating read sequence number 192 triggers a GetNext(78).

When cursor state 252 is stored in volatile memory, delivery protocol 283 provides at least once assurances. If cursor 208 fails between sending and/or receiving the various messages of delivery protocol 283 there is essentially no way for cursor state 252 to be recovered. As a result, it is possible to request the same message multiple times and also possible for a message to be dropped from message log 206 before it is requested. However, since message log 206 implements a drop oldest policy, message log 206 moves forward in message sequence 252, at least to some extent, on its own.

When cursor state 252 is stored in durable storage, delivery protocol 283 can provide at least once assurance across system restarts. Message consumer 207 sends Receive( ) 221 to lock (e.g., record a lock) a message corresponding to the sequence number after 76. Message consumer 207 can then call Delete( ) 223 upon receipt of message 236 (or even before message 236 is actually received). A call from Delete( ) 223 can release the lock. Thus, upon releasing the lock, cursor 208 can insert entry 258 into cursor state 252 before message 236 is processed (or even received).

For example, after insertion of entry 258, it may be that transfer protocol 282 fails obtain message 236. Further, even if transfer protocol 282 returns message 236, cursor 208 can fail before sending message 236 to message consumer 207. Additionally, even if cursor 208 sends message 236 to message consumer 207, message consumer may fail to receive message 236. In any of these situations, sending another Receive( ) 221 causes, cursor 208 to send GetNext(78), since entry 258 is included in cursor state 252. Thus, message 236 is received at message consumer 207 at most once.

Accordingly, computer architecture 200 provides best effort end to end assurance 264 between message producer 203 and message consumer 207. That is, any message successfully written to message log 206 is received at most once at message consumer 207. Best effort assurance results from efforts to minimize message loss and minimize message duplication.

Figure 3:
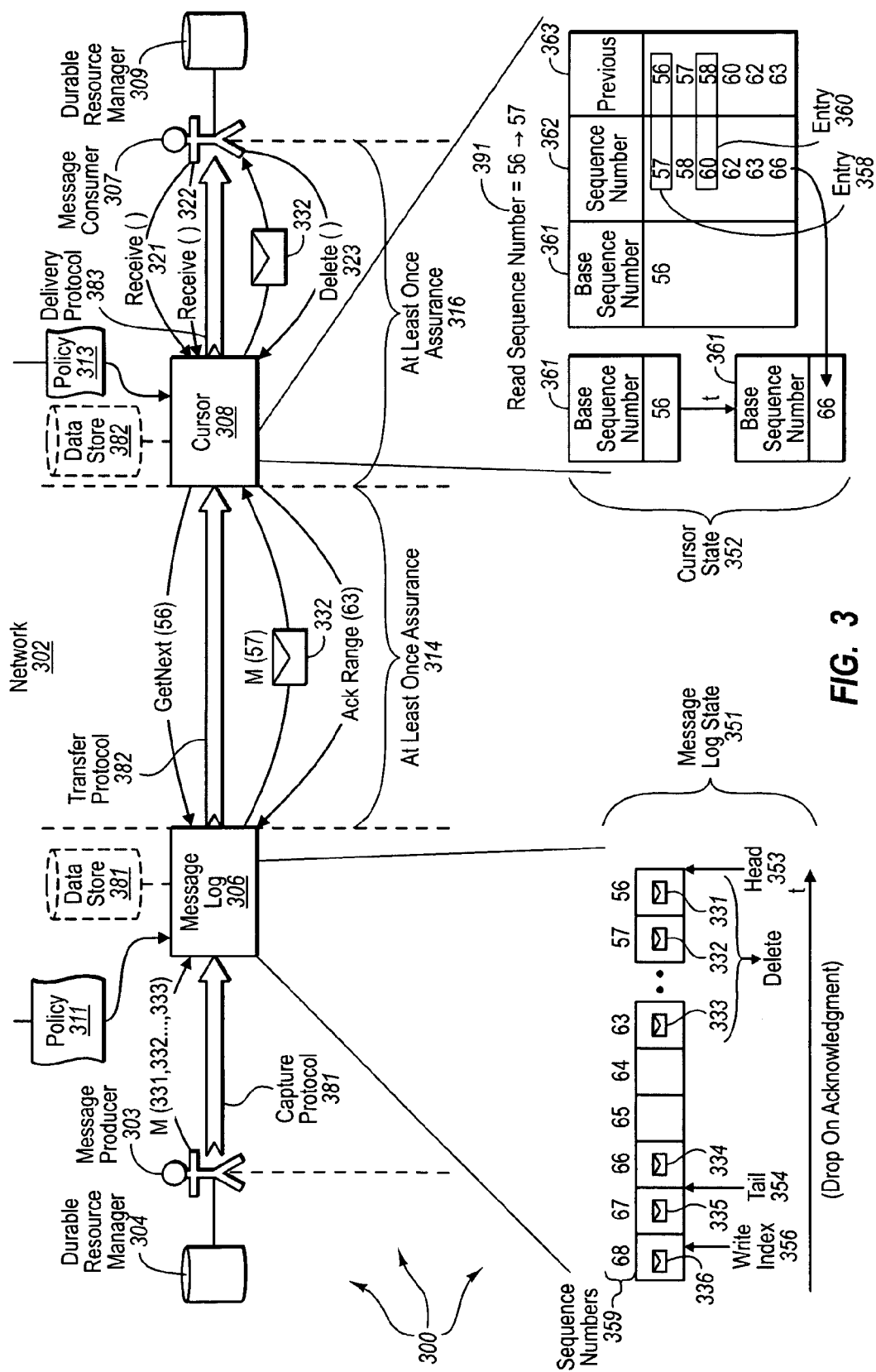
FIG. 3 illustrates an example computer architecture that facilitates message state maintenance in a componentized messaging system that provides at least once message assurances between some components.

FIG. 3 illustrates an example computer architecture 300 that facilitates message state maintenance in a componentized messaging system that provides at least once message assurances between some components.

As depicted, computer architecture 300 includes durable resource manager 304, message producer 303 (e.g., a message producing application), message log 306, network 302, cursor 308, message consumer 307 (e.g., a message consuming application), and durable resource manager 309.

Policy 311 indicates behaviors for message log 306 and components that are to be activated and/or deactivated to implement capture protocol 381. Policy 311 can indicate to message log 106 that it is to use a drop on acknowledgement message retention policy. Policy 311 can also indicate that message log 206 is to use volatile and/or durable storage for storing messages captured from message producer 303. Policy 311 can also indicate that message log 306 is to use volatile and/or durable storage for storing message log state 352. Message log 306 can store messages in data store 381 when durable storage is indicated. When durable storage is used, successfully captured messages and/or message log state 351 can survive system restarts at message log 306.

Capture protocol 381 can provide an at least once assurance that messages from message producer 303 are captured in message log 306. That is, messages are sent from message producer 303 to message log 306. Any messages successfully reaching message log 306 can be accepted and confirmed. Message producer 303 can retry when confirmation is not received.

Message log state 351 represents the state of message log 306. Message log state maintains (e.g., monotonically increasing) sequence numbers 359 and associations to corresponding messages. Message log state 351 is updated, when message log 306 accepts a new message for writing. Message log state 351 can write messages, maintain sequence number to message associations, and maintain head 353, tail 354, and write index 356, similarly to message log state 251. Thus, sequence numbers from head 353 to tail 354 (sequence numbers 56 through 66) are visible to cursor 308. Sequence numbers from tail 354 to write index 356 (sequence numbers 67 and 68) are in doubt and are not visible to cursor 308. Further, as the success or failure of message writes becomes known, tail 354 can be moved back to higher sequence numbers.

Cursor state 352 represents the state of cursor 308. Cursor state 352 includes a base sequence number 361, sequence numbers 362, and previous 363. Base sequence number 361 represents a low water mark of messages that message consumer 307 has consumed. For example, base sequence number 361 represents that message consumer 307 is not to request any message sequence less than or equal to sequence number 56.

Any messages marked as deleted after sequence number 56 are tracked using sequence number 362 and previous 363. The use of both sequence number 362 and previous 363 facilitates compensating for holes in message log state 351. For example, entry 360 indicates that sequence number 60 was returned in response to a request for a message after sequence number 58. Thus, cursor state 352 reflects lack of a message (i.e., hole) corresponding to sequence number 59 in message log state 351. From time to time, when a contiguous range of sequence numbers is present in sequence number 362, cursor state 352 can be compacted by updating base sequence number 361 and removing data from sequence number 362 and previous 363. For example, base sequence number 361 can be updated to sequence number 66 and other entries deleted.

Policy 313 indicates behaviors for cursor 308 and components that are to be activated and/or deactivated to implement delivery protocol 383. Policy 313 can also indicate that cursor 308 is to use durable storage for cursor state 352. Cursor 308 can store cursor state 352 in data store 382 when durable storage is indicated. When durable storage is used, cursor state 352 can survive system restarts at cursor 308. Delivery protocol 383 can provide at least once assurance 316. When volatile storage is used to store cursor state 352 at least once assurance 316 does not span failures. On the other hand, when durable storage is used to store cursor state 352, at least once assurance is provided even when failures occur.

Policy 311 and policy 313 can also indicate behaviors of and component activation/deactivation at message log 306 and cursor 308 respectively to implement transfer protocol 382. Transfer protocol 382 can provide at least once assurance 314.

To request a new message, message consumer 307 can send Receive( ) 321 to cursor 308. Receive( ) 321 can implement a protocol that non-destructively locks a next available message, reserving the next available message for message consumer 307. In response to Receive( ) 321, cursor 308 can refer to read sequence number 391 to determine the sequence number of last message that was read. For example, cursor 308 can determine that sequence number 56 was the sequence number of the last message that was read.

In response, cursor 308 can send GetNext(56) to message log 306. GetNext(56) is a request for the next message after the message corresponding to sequence number 56. When message log 306 receives the message, it refers to message log state 351 to identify the next sequence number after sequence number 56 that corresponds to a message. Message log 106 identifies sequence number 57 and corresponding message 332. Message log 306 sends sequence number 56 along with message 332 back to cursor 308.

Transfer protocol 382 provides at least once assurance 314. The drop on acknowledgement message retention policy drops messages when the messages are acknowledged and therefore also provides at least once assurance. Thus, it is highly unlikely that messages will be dropped between multiple sendings of the same request, because the cursor will not send acknowledgement. For example, if cursor 308 were to send GetNext(56) a further time, before acknowledging receipt of message 332, message 332 would be returned again in response to GetNext(56).

Upon receiving sequence number 56 and message 332, cursor 308 sends message 332 to message consumer 307. Message consumer 307 receives and processes message 332. After message consumer 307 is done processing message 332, message consumer 307 sends Delete( ) 323 to cursor 308. Delete( ) 323 instructs cursor 308 to delete message sequence number 56. In response to receiving Delete( ) 323, entry 358 can be inserted into cursor state 352. Thus, a subsequent Receive( ) request after storing entry 258 will trigger a GetNext (57).

When cursor state 352 is stored in durable storage, delivery protocol 383 can provide at least once assurance 316 across system restarts. Message consumer 307 can send Receive( ) 321 to lock (e.g., record a lock) a message corresponding to the sequence number after 56. Message 332 is then received and processed at message consumer 307. Message consumer 307 can then call Delete( ) 323 after message 332 is fully processed. A call to Delete( ) 323 can release the lock. Thus, upon releasing the lock, cursor 308 can insert entry 358 into cursor state 352 after message 332 is fully processed.

Thus, any failures at cursor 308 after sending message 332 to message consumer 307 but before receiving Delete( ) 323 from message consumer do not prevent cursor 308 from obtaining message 332 again (e.g., in response to subsequently transferred Receive( ) 322). That is, since insertion of entry 358 is after consumer 307 is done with message 332, cursor state 352 at the time of a failure prior to processing message 332 does not include entry 358. Further, since message log 306 implements a drop on acknowledgment policy, message log 306 is unlikely to drop message 332 in between a GetNext(56) and a subsequent GetNext(56).

Processing of subsequent messages can cause cursor state 352 to evolve past entry 358.

From time to time, (possibly in conjunction with compaction of cursor state 352), cursor 308 can acknowledge a range of messages that it has marked as deleted (and thus is unlikely to request again). For example, cursor 308 can send Ack-Range(63) to message log 306. Message log 306 can receive AckRange(63). In response, message log 306 can drop sequences numbers at and below 63. This can result, for example, in deleting messages 331, 332, and 333. Head 353 can then be moved to precede sequence number 64. Ack-Ranges can be sent at specified time intervals, after processing a specified number of sequence numbers, etc. To generate an AckRange, cursor 308 can refer to cursor state 352, and more specifically the most recently entered sequence number, such as, for example, sequence number 66.

Accordingly, computer architecture 300 provides an at most once message assurance between message log 306 and message consumer 307. That is, any message successfully written to message log 306 is received at message consumer 307 at least once.

Figure 4:
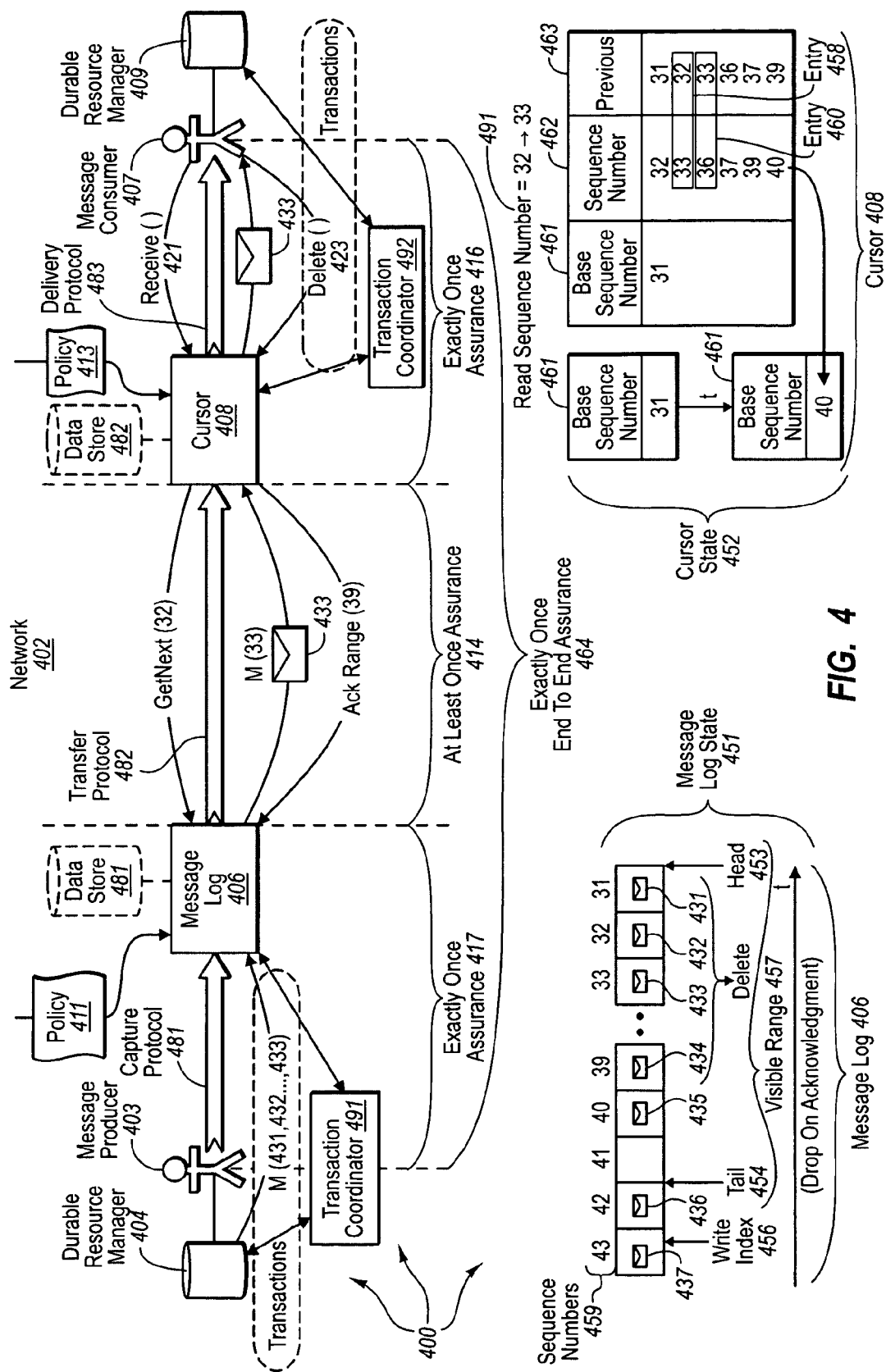
FIG. 4 illustrates an example computer architecture that facilitates message state maintenance in a componentized messaging system that provides exactly once end to end message assurances.

FIG. 4 illustrates an example computer architecture 400 that facilitates message state maintenance in a componentized messaging system that provides exactly once end to end message assurances.

As depicted, computer architecture 400 includes durable resource manager 404, message producer 403 (e.g., a message producing application), message log 406, transaction coordinator 491, network 402, cursor 408, message consumer 407 (e.g., a message consuming application), durable resource manager 409, and transaction coordinator 492.

Policy 411 indicates behaviors for message log 406 and components that are to be activated and/or deactivated to implement capture protocol 481. Policy 411 can indicate to message log 406 that it is to use a drop on acknowledgement message retention policy. Policy 411 can also indicate that message log 406 is to use volatile and/or durable storage for storing messages captured from message producer 403. Policy 411 can also indicate that message log 406 is to use volatile and/or durable storage for storing message log state 451. Policy 411 can also indicate that message log 406 is to participate in transactions when capturing messages. Message log 406 can store messages in data store 481 when durable storage is indicated. When durable storage is used, successfully captured messages and/or message log state 451 can survive system restarts at message log 406.

Capture protocol 481 can provide exactly once assurance 417 that messages from message producer 403 are captured in message log 406. That is, messages sent from message producer are assured to be captured at message log 406 exactly once.

Message log state 451 represents the state of message log 406. Message log state maintains (e.g., monotonically increasing) sequence numbers 459 and associations to corresponding messages. Message producer 403 can send messages to message log 406. Messages sent message log 406 can be based on resources from durable resource manager 401. Message producer 403 is configured to initiate transactions for transferring messages to message log 406.

When sending a message to message log 406, message producer 403 can attach a capture transaction ID to the message. Message producer 403 can instruct durable resource manager 404 and message log 406 to contact transaction coordinator 491 to enlist in a transaction corresponding to a designated capture transaction ID. The transaction coordinates sending of a message (e.g., message 431) to message log 406 with change in or more resources managers like 401 (i.e., the changes happened in all or none of the resource managers).

Message log 406 can enlist in transactions corresponding to designated capture transaction IDs at transaction coordinator 491 as a result of receiving a message from message producer 403 and store the message in data store 481 (durable storage).

Accordingly, message producer 403 can start a transaction, read data from resource manager 401, and send a message (e.g., message 431) containing the data and an attached transaction ID to message log 406. Message log 406 receives the message and attached transaction ID. Message log 406 enlists in a transaction corresponding to the transaction ID (e.g., using a request/response to a transaction coordinator). Message log 406 then responds to message producer 403 indicating its enlistment in the transaction.

As previously described, when a message log receives a message, it can accept the message for writing to the message log. A message log writer can be used to write accepted messages into message log. When utilizing transactions, message log 406 can accept a message for writing when it enlists in a transaction.

As part of the preparation phase of the transaction, the message log writer can refer to a reservation based policy for writes. Thus, the message log writer can secure storage space for a message prior to writing message log state. The message log writer can use a resource gate to check for available storage space. For an accepted message, the message log writer computes the size of the message and requests to reserve space to store the message. When space is successfully reserved, the message log writer assigns a sequence number (e.g., monotonically increasing) to the accepted message.

After reserving storage space and assigning a sequence number, the message log writer indicates that it is prepared to commit the transaction. If the transaction is subsequently committed, the reserved storage space is updated from reserved to used. On the other hand, if the transaction aborts, the reserved storage space is updated from reserved to free.

A message log (and message log writer) can participate in parallel transactions for writing messages to message log 406. Thus, it is possible for the message log to know the outcome of writing messages with sequence numbers of greater value before the out come of messages with sequence numbers of lesser value. For example, a transaction for a message with a higher sequence number can commit or abort before a transaction for a message with a lower sequence number. However, the visibility of messages to cursor 408 can be limited to contiguous ranges of sequence numbers. For example, it may be that a transaction for a message with sequence number 2 commits before a transaction for a message with sequence number 1 commits. However, the message with sequence number 2 is not made visible to cursor 408 until the outcome of the transaction for the message with sequence number 1 is known. Limiting the visibility to contiguous ranges helps insure that messages are not read out of order.

Accordingly, the message log writer can use head 453, tail 554, and write index 456 to regulate the visibility of messages in message log state 451. Head 453 represents the beginning of message log state 451. Messages closer to head 453 are older messages that have been in message log state 451 for a longer period of time. Tail 454 represents a location in message log state 451 before which the status of message writes is known (i.e., transaction for these messages either committed or aborted). That is, the status of transactions for messages with sequence numbers between head 453 and tail 454 (sequence numbers 31 through 41) is known. Thus, these sequence numbers, for example, visible range 457, are made visible to cursor 408. As the further transactions commit or abort, tail 454 can be moved back to higher sequence numbers.

Write index 456 represents the sequence number corresponding to the last message write attempt. Transactions for messages between tail 454 and write index 456 may be in doubt (sequence numbers 42 and 43). A transaction is doubt prior to the transaction either committing or aborting. That is, a sequence number is assigned and/or storage space is reserved, but it is undetermined if the transaction has committed or aborted. The message log writer can keep track transaction outcomes in memory. Upon detecting completed transactions (either committing or aborting) for a message at tail 454, the message log writer updates the message log state 451 by moving the location of tail 454 to the next highest sequence number between tail 454 and write index 456 which is still in doubt.

Cursor state 452 represents the state of cursor 408. Cursor state 452 includes a base sequence number 461, sequence numbers 462, and previous 463. Base sequence number 461 represents a low water mark of messages that message consumer 407 has consumed. For example, base sequence number 461 represents that message consumer 407 is not to request any message sequence less than or equal to sequence number 31.

Any messages marked as deleted after sequence number 31 are tracked using sequence number 462 and previous 463. The use of both sequence number 462 and previous 463 facilitates compensating for holes in message log state 451. For entry 460 indicates that sequence number 36 was returned in response to a request for a message after sequence number 33. Thus, cursor state 352 reflects lack of a message (i.e., hole) corresponding to sequence numbers 34 and 35 (not shown) in message log state 451. From time to time, when a contiguous range of sequence numbers is present in sequence number 462, cursor state 452 can be compacted by updating base sequence number 461 and removing data from sequence number 462 and previous 463. For example, base sequence number 461 can be updated to sequence number 40 and other entries deleted.

Policy 413 indicates behaviors for cursor 408 and components that are to be activated and/or deactivated to implement delivery protocol 483. Policy 413 can also indicate that message cursor 408 is to use durable storage for cursor state 452. Cursor 408 can store cursor state 452 in data store 482 when durable storage is indicated. When durable storage is used, cursor state 452 can survive system restarts at cursor 408. Policy 413 can also indicate that cursor 408 is to participate in transactions when deleting messages. Delivery protocol 483 can provide exactly once assurance 416 that messages are delivered to and appropriately processed at message consumer 407 before they are deleted. Delivery protocol 483 can utilize transactions and data store 482 to provide exactly once assurance 416.

Policy 411 and policy 413 can also indicate behaviors of and component activation/deactivation at message log 406 and cursor 408 respectively to implement transfer protocol 482. Transfer protocol 482 can provide at least once assurance 414, similar to at least once assurance 314.

To request a new message, message consumer 407 can send Receive( ) 421 to cursor 408. Receive( ) 421 can implement a protocol that non-destructively locks a next available message (e.g., recording a lock in data store 482), reserving the next available message for message consumer 407. In response to Receive( ) 421, cursor 408 can refer to cursor state 452 to determine the sequence number of last message it marked deleted at the request of message consumer 483. For example, cursor 408 can determine that sequence number 32 was the last sequence number marked as deleted.

In response, cursor 408 can send GetNext(32) to message log 406. GetNext(32) is a request for the next message after the message corresponding to sequence number 32. When message log 406 receives the request, it refers to message log state 451 to identify the next sequence number after sequence number 32 that corresponds to a message. Message log 106 identifies sequence number 33 and corresponding message 433. Message log 406 sends sequence number 33 along with message 433 back to cursor 408.

Transfer protocol 482 provides at least once assurance 414, similar to at least once assurance 314, due at least in part to implementation of a drop on acknowledgement message retention policy at message log 406. The drop on acknowledgement message retention policy drops messages when the messages are acknowledged. Thus, it is highly unlikely that messages can be dropped between multiple sendings of the same request.

Upon receiving sequence number 33 and message 433, cursor 408 sends message 433 to message consumer 407. Message consumer 407 receives and processes message 432. After message consumer 407 is done processing message 332 (e.g., has instructed durable resource manager 409 to perform various operations), message consumer 407 sends Delete( ) 423 to cursor 308. Delete( ) 423 can be of the form Delete (TxID, LockID), wherein TxID is a transaction Id identifying a transaction that cursor 408 is to enlist in and LockID identifies a lock corresponding to message 433. From the LockID, cursor 408 can determine that Delete( ) 423 corresponds to sequence number 33. Thus, Delete( ) 423 essentially instructs cursor 408 to join a transaction to delete message sequence number 33.

In response to Delete( ) 423, cursor 408 can use the TxID to enlist in a transaction with transaction coordinator 492. Durable resource manager 409 can also enlist in the transaction. Cursor 408 can prepare by insuring that entry 458 can be written to cursor state 452. Durable resource manager 409 can prepare by insuring it can perform various operations message consumer 407 has passed to it. If the transaction commits, the lock is released, entry 458 is entered into cursor state 452, and the various prepared operations are performed at durable resource manager 409. On the other hand, if the transaction aborts, entry 458 is not entered into cursor state 452 and no prepared operations are performed at durable resource manager 409.

Further, since message consumer 407 initiates transactions for deleting messages after messages are fully processed, any failures at cursor 408 in between sending message 433 and receiving Delete( ) 423 do not prevent cursor 408 from obtaining message 433 again. That is, since insertion of entry 458 is trigged by message consumer 407 completing processing of message 433, there is little, if any, chance of cursor state 452 containing entry 458 if cursor 408 fails prior to message consumer 407 processing message 432

Further, since message log 406 implements a drop on acknowledgment policy, message log 406 is unlikely to drop message 433 in between a GetNext(32) and a subsequent GetNext(32). Additionally, since operations at durable resource manager 409 are rolled back, the state at durable resource manager 409 is the same when message 433 is received again at message consumer 407 (e.g., after an aborted transaction).

Processing of subsequent messages can cause cursor state 452 to evolve past entry 458.

From time to time, (possibly in conjunction with compaction of cursor state 452), cursor 408 can acknowledge a range of messages that it has marked as deleted (and thus is unlikely to request again). For example, cursor 408 can send Ack-Range(39) to message log 406. Message log 406 can receive AckRange(39). In response, message log 406 can drop sequences at and below 39. This can result, for example, in deleting messages 431, 432, 433, and 434. Head 453 can then be moved to precede sequence number 40. AckRanges can be sent at specified time intervals, after processing a specified number of sequence numbers, etc. To generate an AckRange, cursor 408 can refer to cursor state 452, and more specifically the most recently entered sequence number, such as, for example, sequence number 40.

Accordingly, computer architecture 400 provides end to end exactly once message assurance 464. That is, any message sent from message producer 403 is received at message consumer 407 and the impact of fully processing the message is realized exactly once.

Figure 5:
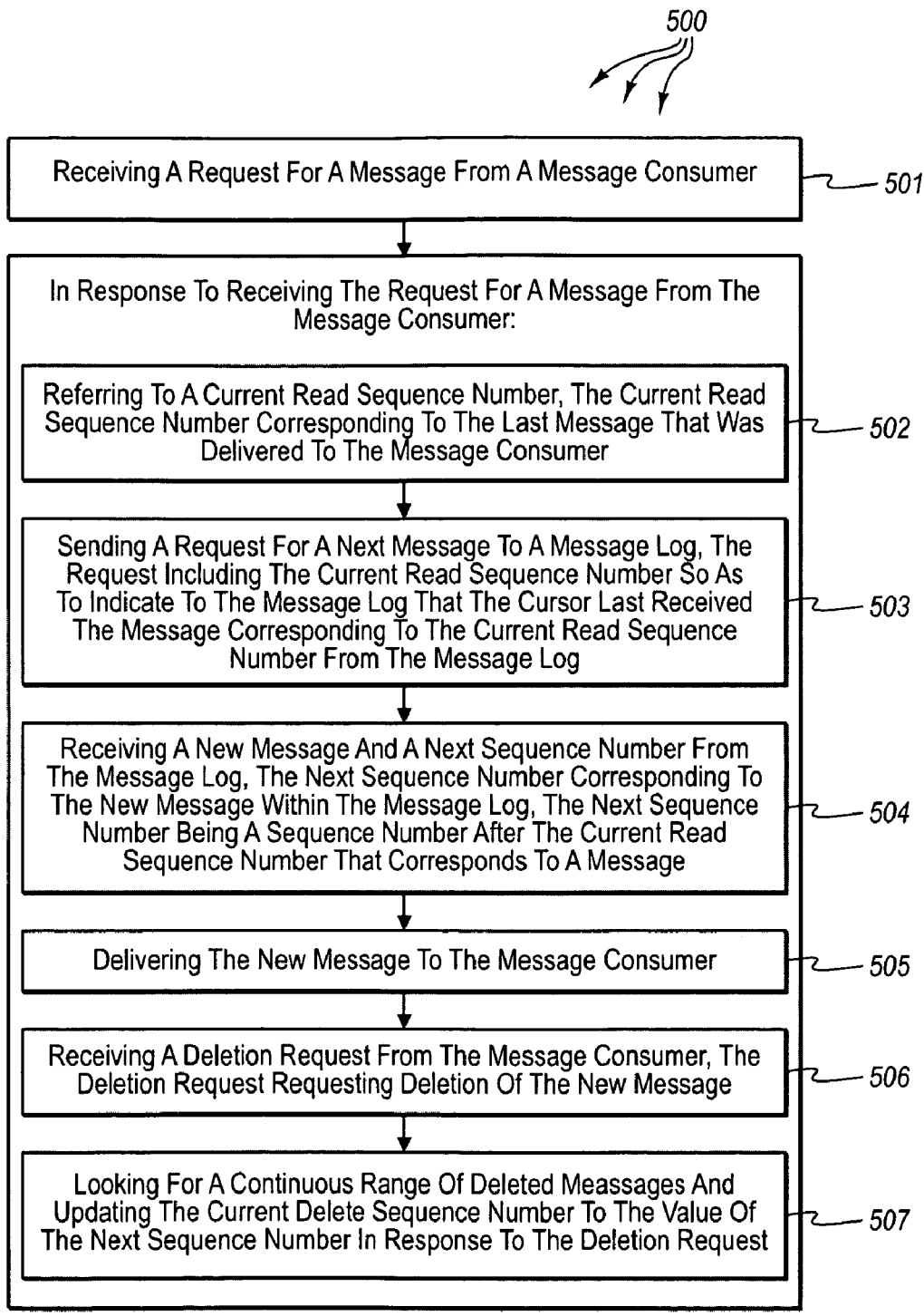
FIG. 5 illustrates a flow chart of an example method for maintaining message state at a cursor.

FIG. 5 illustrates a flow chart of an example method 500 for maintaining message state at a cursor. Method 500 will be described with reference to cursor 208. However, method 500 can also be implemented at any of cursors 108, 308, and 408 in combination with other features previously described with respect to cursors 108, 308, and 408.

Method 500 includes an act of receiving a request for a message from a message consumer (act 501). For example, cursor 208 can receive Receive( ) 221 from message consumer 207.

In response to receiving the request for a message from the message consumer, method 500 includes an act of referring to a current sequence number, the current sequence number corresponding to the last message that was delivered to (act 502). For example, cursor 208 can refer to read sequence number 291 to determine that sequence number 76 was the last message delivered to message consumer 207.

In response to receiving the request for a message from the message consumer, method 500 includes an act of sending a request for a next message to a message log, the request including the current sequence number so as to indicate to the message log that the cursor last received the message corresponding to the current sequence number from the message log (act 503). For example, cursor 208 can send GetNext(76) to message log 206. Sequence number 76 indicates that cursor 208 is requesting the next sequence number after sequence number 76 that corresponds to a message.

Method 500 includes an act of receiving a new message and a next sequence number from the message log, the next sequence number corresponding to the new message within the message log, the next sequence number being a sequence number after the current sequence number that corresponds to a message (act 504). For example, in response to receiving GetNext(76), message log 206 can return sequence number 78 along with message 236 to cursor 208. Cursor 208 can receive sequence number 78 along message 236 from message log 206. Optionally, message log 206 can also send sequence number 76 back to cursor 208 to indicate the sequence number that triggered the identification of message 236. For example, message log 206 can return an indication similar to M(78,76) back to cursor 208 along with message 236. M(78,76) expressly indicates to cursor 208 that there is a hole at sequence number 77.

Method 500 includes an act of delivering the new message to the message consumer (act 505). For example, cursor 208 can send message 236 to message consumer 207. Method 500 includes an act of receiving a deletion request from the message consumer, the deletion request requesting deletion of the new message (act 506). For example, cursor 208 can receive Delete( ) 223 from message consumer 207. Method 500 includes an act of looking for a continuous range of deleted messages and updating the current delete sequence number to the value of the next sequence number in response to the deletion request (act 507). For example, cursor 208 can insert entry 258 into cursor state 252 to indicate that the delete sequence number is now 78.

Figure 6:
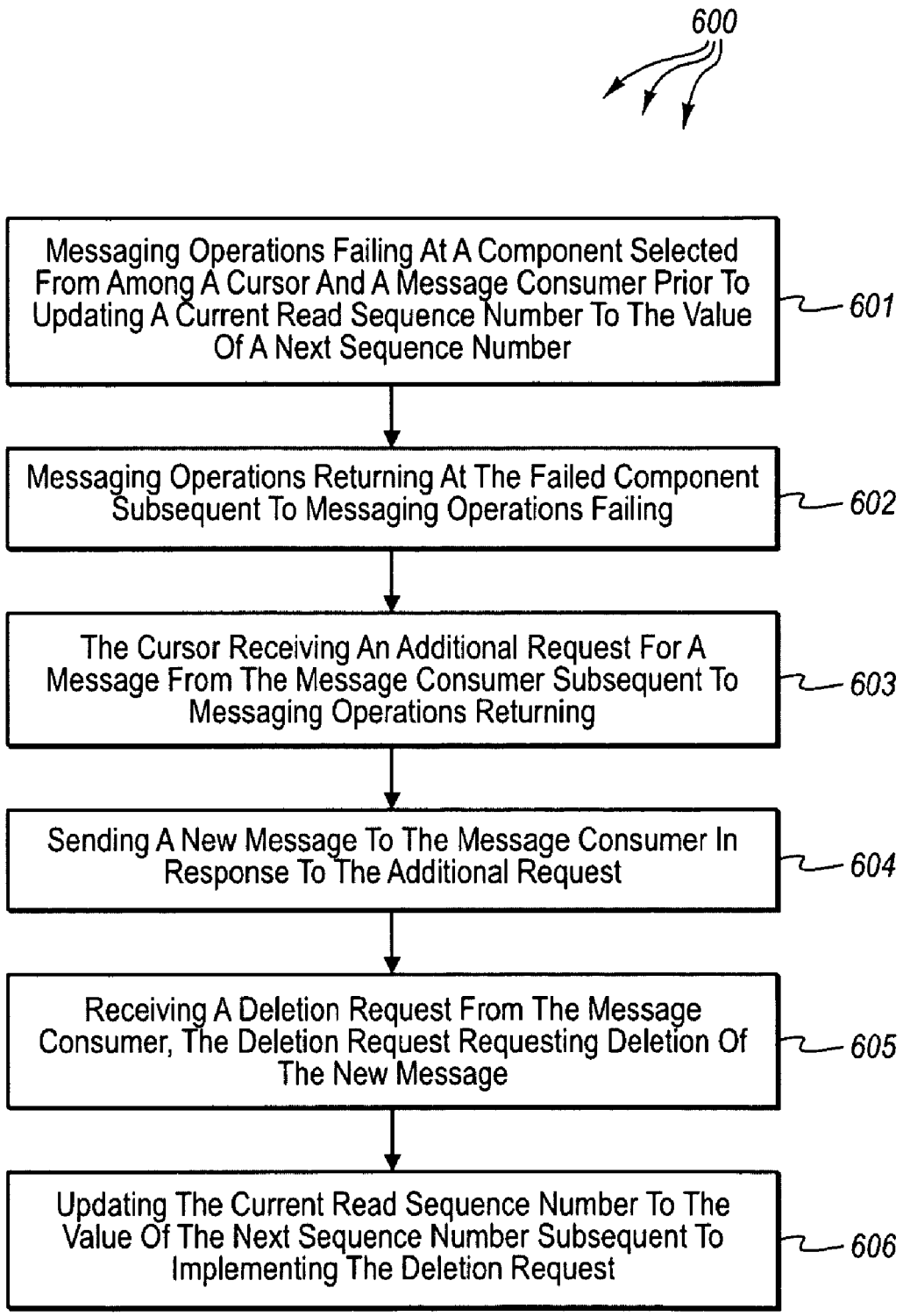
FIG. 6 illustrates a flow chart of an example method for maintaining message state at a cursor.

Embodiments of the invention also include maintaining message state when messaging operations temporarily fail during delivery of a message. FIG. 6 illustrates a flow chart of an example method 600 for maintaining message state at a cursor. Method 600 will be described with reference to cursor 308. However, method 600 can also be implemented at either of cursors 108 and 408 in combination with other features previously described with respect to cursors 108 and 408.

Method 600 includes an act of messaging operations failing at a component selected from among the cursor and the message consumer prior to updating a current read sequence number to the value of the next sequence number (act 601). For example, as previously described, cursor 308 can receive sequence number 57 along with message 332. Cursor 308 can then send message 332 to message consumer 307. Prior to cursor 308 updating read sequence number 391 and inserting entry 358 into cursor state 352, cursor 308 and/or message consumer 307 can fail. In some embodiments, message consumer 307 fails before sending Delete( ) 323 to cursor 308. In other embodiments, cursor 308 fails prior to receiving Delete( ) 323. In further embodiments, cursor 308 receives Delete( ) 323 but fails prior to inserting entry 358 into cursor state 352.

Some portions of state at a cursor are volatile by design. For example, read sequence number 391 is stored in volatile storage. Similarly, locks, such as, for example, a lock used when implementing a peek-lock protocol, are stored in volatile storage. Thus, in response to a failure at a cursor, a read sequence number as well as any locks are lost. On the hand, other portions of state at a cursor are stored durably. For example, delete base sequence numbers (e.g., 361) as well as individual delete entries (e.g., 358 ad 360) are stored in durable storage. Thus, in response to a failure at a cursor, a delete base sequence number as well as individual delete entries are not lost. Thus, when a cursor comes back online, the cursor can refer to the base sequence number and individual delete entries to determine what messages have been deleted from its perspective. The cursor can reset its read sequence number to the last message it determines was deleted.

Method 600 includes an act of messaging operations returning at the failed component subsequent to the messaging operations failing (act 602). For example, the computer system including cursor 308 and/or message consumer 307 can detect that message operations have returned at cursor 308 and/or message consumer 307 subsequent to cursor 308 and/or message consumer 307 failing. For example, cursor 308 and/or consumer 307 can restart, reboot, etc.

Method 600 includes an act of receiving an additional request for a message from the message consumer subsequent to messaging operations returning (act 603). For example, cursor 308 can receive Receive( ) 322 subsequent to messaging operations returning at cursor 208 and/or message consumer 307.

Method 600 includes an act of sending the new message to the message consumer in response to the additional request (act 604). For example, cursor 308 can again refer to cursor state 352 to determine that sequence number 56 was the last message that message consumer 307 requested for deletion. Cursor 308 can reset read sequence number 319 to 56. If message 332 is cached, cursor 308 can return message 332 to message consumer 307 directly.

On the other hand, if message 332 is not cached, cursor 308 can send GetNext(56) to message log 306. Sequence number 56 indicates that cursor 308 is requesting the next sequence number after sequence number 56 that corresponds to a message. Cursor 308 can receive sequence number 57 (and optionally attached sequence number 56) along with message 332 from message log 306. Cursor 308 can (e.g., again) send message 332 to message consumer 307.

Method 600 includes an act of receiving a deletion request from the message consumer, the deletion request requesting deletion of the new message (act 605). For example, cursor 308 can again receive Delete( ) 323 from message consumer 307. Method 600 includes an act of updating the current read sequence number to the value of the next sequence number subsequent to the deletion request (act 606). For example, cursor 308 can update read sequence number 391 to 57. Cursor 308 can also insert entry 358 into cursor state 352.

Figure 7:
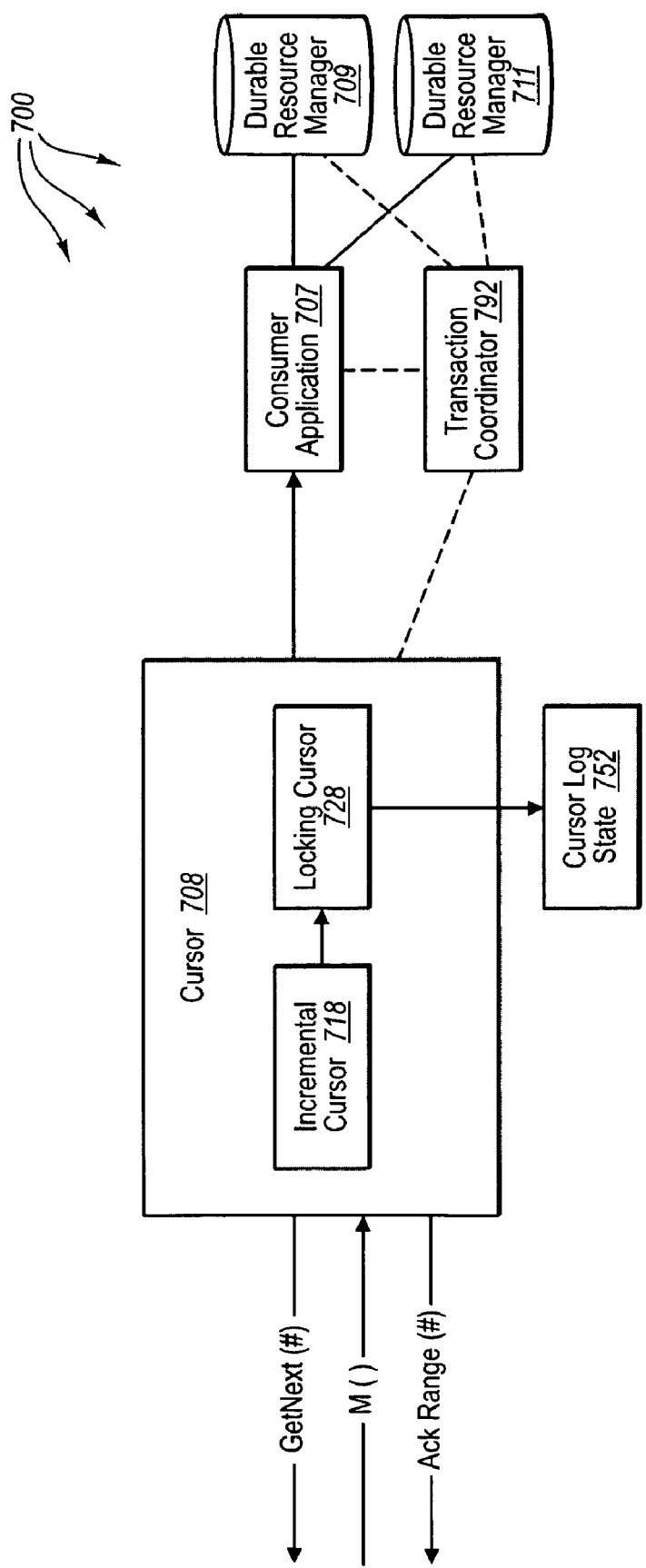
FIG. 7 illustrates an example computer architecture including a more detailed view of an example cursor.

As previously described, message logs and cursors can each include activatable and deactivatable components that can be activated and deactivated in various different combinations to compose desired message assurances or portions thereof FIG. 7 illustrates example computer architecture 700 including a more detailed view of an example cursor. As depicted, computer architecture 700 includes cursor 708, cursor log state 752, consumer application 707, transaction coordinator 792, and durable resource managers 709 and 711. Cursor 708 further includes incremental cursor 718 and locking cursor 728.

Locking cursor 728 is configured to keep track of message states (e.g., in cursor state). Message identifiers (but not necessarily messages) are stored against their corresponding states. Messages can be in the following states:

Locked: A message is currently locked by a consumer. No other consumers using the same cursor can access the message.

Unlocked/available: A message is available or a message that was previously locked has been unlocked and is available.

Deleted: A message has been deleted.

Locking cursor 728 is also configured to interact with incremental cursor 718 to fetch a particular message and fetch the next available message. Incremental cursor 718 can fetch a particular message when the message is cached and unlocked. Incremental cursor 718 can fetch the next available message (e.g., using a transfer protocol) when no unlocked messages are cached.

Locking cursor 728 can also interact with a delivery protocol that implements non-destructive message locking for a message consumer. Locking cursor 728 can also interact with cursor log state 752 to mark a message as deleted.

In multi-consumer environments, locking cursor 728 can also calculate offsets from a current sequence number and issue multiple offset-based 'GetNext( )' requests to the incremental cursor, which in turn requests messages from an appropriate message log.

Thus, cursor 708 may not expose a sequence number to consuming application 707. Instead cursor 708 can expose a lock ID for any message that is non-destructively locked. Any message received from the message log can have the following attributes:

MessageID: An ID of the Message

Sequence number, previous sequence number: both are message specific and can be stripped off before sending it off to the delivery service.

As such, locking cursor 728 can generate a lock ID (e.g., a unique GUID) called for successfully locked messages, inserts the lock ID as a message property, and passes the message on to the delivery protocol. Locking cursor 728 maintains a mapping between lock ID and sequence number to appropriately handle Delete requests from consumer application 707 and translate them into record of deletes by sequence number in cursor log state 752.

Incremental cursor 718 is configured to interact with locking cursor 728 and an appropriate message log. Incremental cursor 718 can: fetch a particular message, given the sequence number (e.g., from cache), fetch the next available message in the message log (e.g., using GetNext( ), send AckRanges( ), and calculate and maintain the current sequence number for cursor 708. Incremental cursor 718 can also maintain an internal counter that is incremented each time a request for a new message (GetNext( )) is made to the message log.

Cursor 708 can also include a transaction component (not shown) (e.g., to interact with transaction coordinator 492) and durable store component (not shown) (e.g., similar to data store 482). Generally, components can be activated and deactivated to compose any of an extensible set of delivery protocols and transaction protocols. Each delivery protocol can be configured to provide a different delivery assurance. For example, delivery protocols can vary in the use of the transaction component and durable state component to provide different delivery assurances (e.g., volatile transactions are possible).

When activated, a transaction buffer keeps track of the deletes for transactions that are in progress. The transaction buffer can enlist in a transaction as a volatile resource manager, with the option to enlist as a durable resource manager during prepare ("EDPR"). When a consumer application initiates commit, the transaction buffer receives prepare notification. The transaction buffer can then enlist the durable store in the transaction (when activated) and delete a message.

Embodiments of the present inventions can be efficiently scaled to large number of message consumers. Since a cursor can be collocated with its corresponding message consumer, resources under the control of the message consumer can be allocated to a cursor to maintain state for the message consumer. Thus, a message log is relieved from having to maintain state for message consumers and its resources are free up for other purposes. As such, these freed up resources can be utilized to transfer a higher volume of messages. Accordingly, queuing and publish/subscribe ("pub/sub") message patterns can be implemented on larger scale.

Figure 8B:
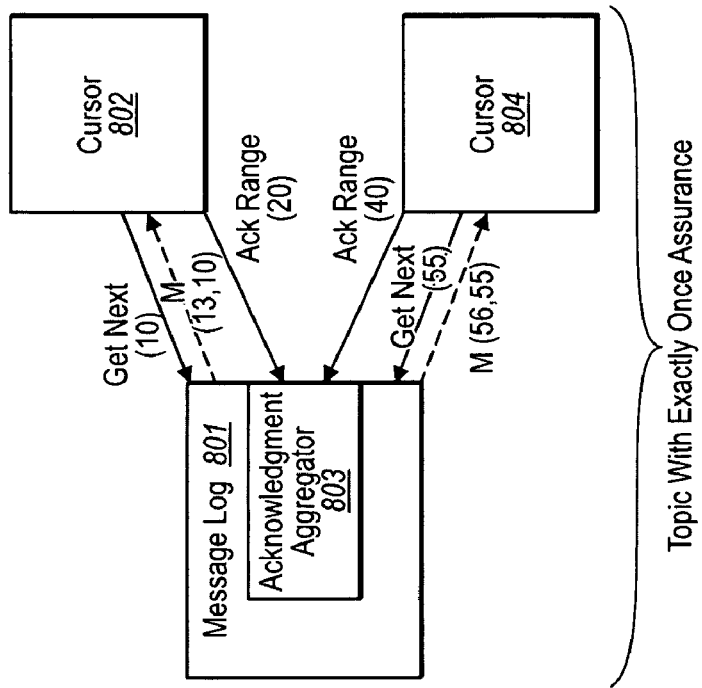
FIGS. 8A-8C depict various architectures for implementing embodiments of the present invention.
Figure 8A:
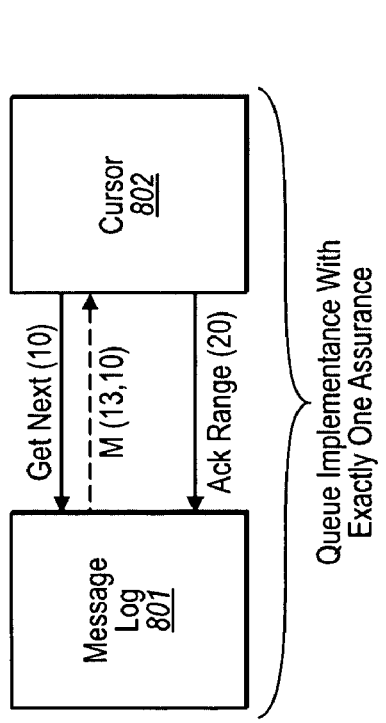

FIG. 8A depicts a message queuing environment with one message and one cursor. In FIG. 8A, cursor 802 requests messages from message log 801. In response to message requests message log 801 returns the next available message based on sequence number. For example, cursor 802 can request the next message after message 10. In response, message log 801 can return message 13. When cursor 802 has dealt with messages up to sequence number 20, cursor 802 can acknowledge processing of all messages in a range of sequence numbers up to 20.

FIG. 8B depicts a message topic (e.g., publish/subscribe) environment with one message log, acknowledgement aggregator and a plurality of cursors. In FIG. 8B, cursor 802 and cursor 804 interact with message log 801 similar to the functionality described in FIG. 8A to request and receive messages. Each cursor uses ranged acknowledgements to indicate sequence numbers that it is unlikely to (or will never) request again. For example, cursor 802 can send AckRange(20) to indicate that is it is unlikely to request messages with a sequence number lower than 20. Likewise, cursor 802 can send AckRange(40) to indicate that is it is unlikely to request messages with a sequence number lower than 40.

Acknowledgment aggregator 803 can aggregate acknowledgements from a plurality of cursors and, based on aggregated acknowledgments, determine a resulting range of sequence numbers is not likely (or will never) be requested by any of the plurality of cursors. For example, based on received AckRange(20) and AckRange(40), acknowledgment aggregator 803 can determine that sequences numbers less than 20 are not likely to (or will never) be requested again from cursor 802 or cursor 804.

Figure 8C:
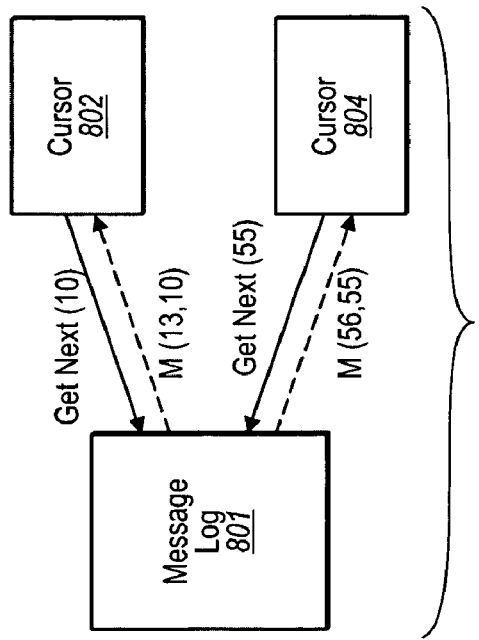

FIG. 8C depicts a message topic (e.g., publish/subscribe) environment with one message log, and a plurality of cursors. Each of the cursors individually requests messages from message log 801. For example, cursor 802 can request the next message after message 10. In response, message log 801 can return message 13. Similarly, cursor 802 can request the next message after message 55. In response, message log 801 can return message 56. No acknowledgments are utilized, resulting in at most once delivery from a message producer to message consumers.

Further since a cursor can be collocated with its corresponding message consumer, transactions can be confined to the same machine or at least to local area networks. That is, a message log is essentially relieved from having to participate in a distributed transaction with its corresponding message consumer over a Wide Area Network, such as, for example, the Internet. Thus, the resource burden for implementing message delivery transactions is reduced at a message log (and potentially entirely eliminated). Further, since cursor and message consumer are collocated, message delivery transactions create minimal wide area network traffic.

Figure 9:
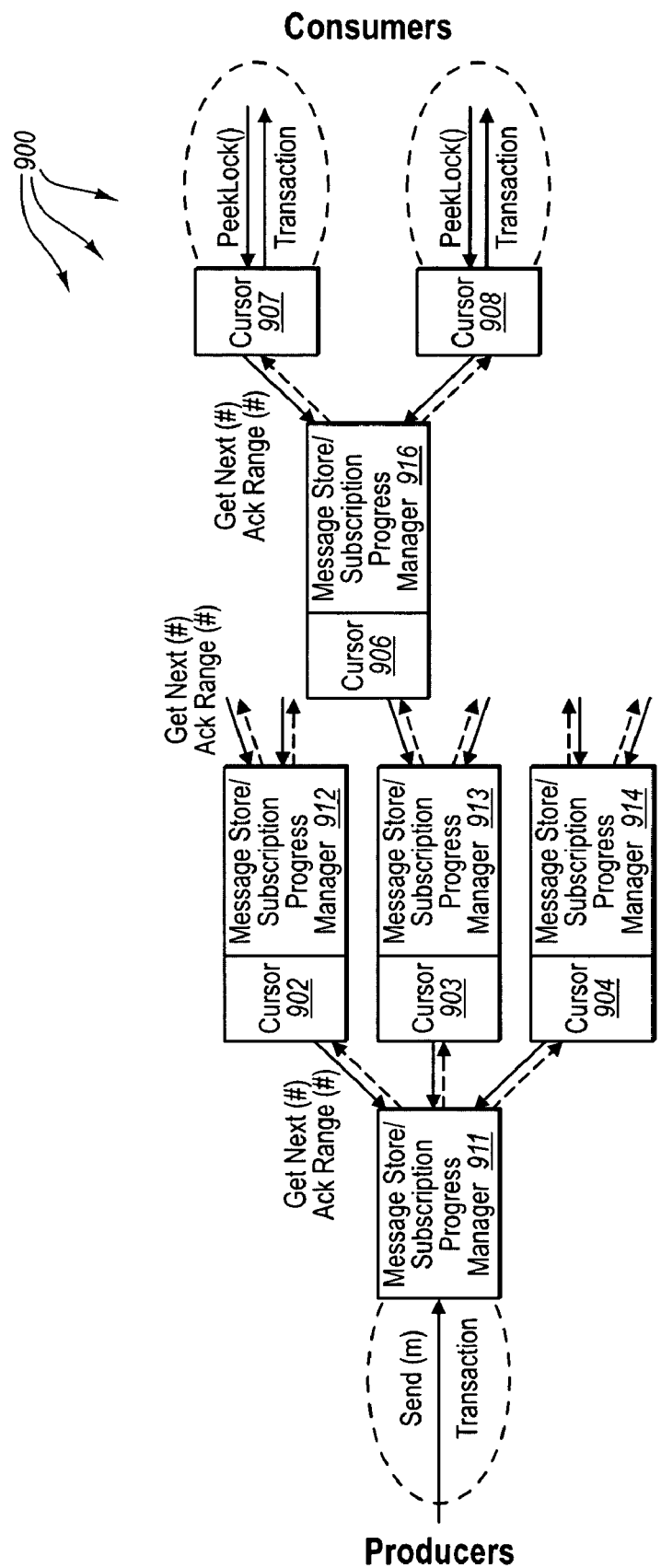
FIG. 9 illustrates a further example computer architecture that facilitates durable exactly once message delivery at scale.

In some embodiments, a message consumer is a further message store/subscription progress manager. These embodiments facilitate larger scale message delivery architectures. For example, FIG. 9 depicts a computer architecture 900 that facilitates durable exactly once message delivery at scale. As depicted in computer architecture 900, producers send messages to message store/subscription progress manager 911. Cursors 902, 903, 904 request and acknowledge messages from message store/subscription progress manager 911. Cursors 902, 903, 904 also maintain message state for message store/subscription progress managers 912, 913, 914 (that can be viewed essentially as message consumers from the perspective of cursors 902, 903, 904) respectively.

One or more further cursors can request and acknowledge messages from each of message store/subscription progress managers 912, 913, 914. For example, cursor 906 can request and acknowledge messages from message store/subscription progress manager 913. Cursor 906 can also maintain message state for message store/subscription progress manager 916.

One or more additional cursors can request and acknowledge messages from message store/subscription progress manager 916. For example, cursors 907 and 908 can request and acknowledge messages from message store/subscription progress manager 916. Cursors 907 and 908 also maintain message state for message consumers.

Figure 10:
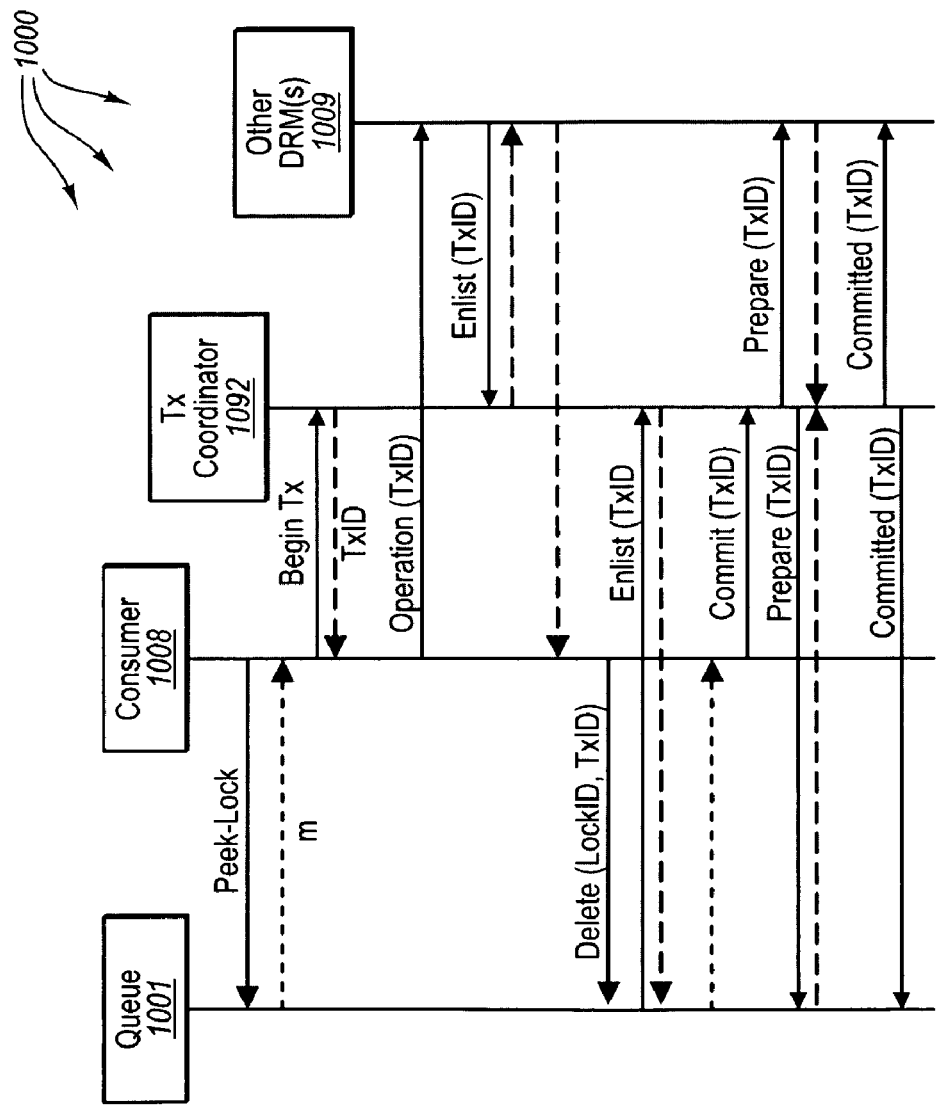
FIG. 10 illustrates an example data flow using a locking protocol and maintaining cursor state.

Non-destructive locking mechanisms can be utilized in a variety of ways to assist in maintaining cursor state. FIG. 10 illustrates an example data flow 1000 using a locking protocol and maintaining cursor state.

As depicted in data flow 1000, consumer 1008 utilizes a "peek-lock" protocol to initiate delivery of a message. In example data flow 1000, a corresponding cursor, message log, and message providers provide the functionality of message queue 1001 to consumer 1008. A peek-lock protocol is based on at least two discrete actions. In a first discrete action, message consumer 1008 accesses (or "peeks" at) the contents of a message. As part of this action, the communication medium (e.g., a cursor) locks the message to the message consumer 1008, for the duration of message receipt. The message access or "peek" can trigger the message lock. In a second discrete action, when the message consumer 1008 is done it can signal to delete (upon successful receipt and processing) or unlock (upon unsuccessful receipt and/or processing) the message. When a message is unsuccessfully received and/or processed, it is thus freed up for other consumers to access and process. Accordingly, the separation of actions can significantly increase the chance that the message consumer 1008 receives and processes a message only once.

Thus, a delivery protocol can be implemented in accordance with a delivery algorithm represented in data flow 1000. Consumer 1008 calls Peek-Lock, which is essentially a request for the next available message. Queue 1001 decides which message to return and puts the message in a "locked" state, indicating that the message belongs to consumer 1008. The lock makes the message invisible for subsequent invocations of Peek-Lock. For example, consumer 1008 calls Peek-Lock three times in a row, it will get three different messages. A lock can be valid for a given time-window. If consumer 1008 does not call delete in the given time-window the lock fails and the message is again available (to consumer 1008 as well as any other consumers).

In response to receiving the message, consumer 1008 then contacts transaction coordinator 1092 to initiate a transaction. Consumer 1008 then performs an operation involving other durable resource managers 1009. For example, consumer 1008 can read a customer name and dollar amount from the message and insert the customer name and dollar amount into a database. When a durable resource manager is made aware of a new transaction, the durable resource manager enlists in the new transaction. The durable resource manager returns success from the operation only after it is enlisted in the transaction.

At some point (potentially depending on the message assurances being provided), consumer 1008 calls Delete (LockID, TxID) in the context of the transaction. This can happen in any order related to the calls to other durable resource managers. The cursor fronting for queue 1001 enlists in the transaction.

Consumer 1008 then initiates commit. Transaction coordinator 1092 instructs the cursor and the durable resource manage to prepare. When prepared, the durable resource manager and cursor reply "prepared". If not, the transaction can abort. When all parties are "prepared", transaction coordinator 1092 writes commit record and informs the durable resource manager about this status. Accordingly, if any participant in this protocol crashes, and then recovers from the durable data it has, the system will continue working as if the crash did not occur.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a componentized messaging system including a sending computer system with a message log, a second different receiving computer system with a cursor, and a computer network, wherein the sending computer system and the receiving computer system are connected to the network, the componentized message system for delivering messages from a message producer to a message consumer, the message log for capturing messages for delivery to the message consumer, the cursor maintaining message state for the message consumer such that message consumer state is maintained separate from the sending computer system, a method for maintaining message consumer state at the cursor, the method comprising:

receiving a request for a message from the message consumer;

in response to receiving the request for a message from the message consumer:

referring to a current read sequence number, the current read sequence number corresponding to the last message that was delivered;

sending a request for a next message to the message log, the request including the current read sequence number to indicate to the message log that the cursor last received the message corresponding to the current sequence number from the message log;

receiving a new message and a next sequence number from the message log, the next sequence number corresponding to the new message within the message log, the next sequence number being a sequence number after the current read sequence number;

delivering the new message to the message consumer;

receiving a deletion request from the message consumer, the deletion request requesting deletion of the new message; and storing a record in the cursor state, the record indicating that the cursor considers the new message to be deleted.

2. The method as recited in claim 1, wherein receiving a deletion request from the message consumer comprises receiving a delete request that identifies the next sequence number and a transaction ID, the transaction ID identifying a transaction that the cursor can enlist in to delete the message in conjunction with completed processing of new message.

3. The method as recited in claim 2, further comprising:

assuring exactly once message delivery of the new message from the cursor to the message consumer for committed state, including:

enlisting in the transaction based on the transaction ID;

preparing to store the current read sequence number and next sequence number in response to the deletion request; and wherein storing a record in the cursor state, the record indicating that the cursor considers the new message to be deleted comprising committing the transaction to insert a record of the current read sequence number and the next sequence number.

4. The method as recited in claim 1, further comprising:

receiving a lock request from the message consumer the lock request requesting that the new message be locked for reading by the message consumer;

locking the new message for reading by message consumer in response to the lock request such that the new message is not visible to other message consumers that request messages;

the cursor removing the lock on the message in response to the deletion request;

expiring the lock on the timeout and making the message visible to other consumers; and transitioning the ownership of the lock from the consumer to the specification transaction without unlocking the lock during the transition.

5. The method as recited in claim 4, further comprising:

assuring at most once message delivery of the new message from the cursor to the message consumer, including:

wherein receiving a deletion request comprises receiving the deletion request along with the lock request prior to the message consumer completely processing the message.

6. The method as recited in claim 4, further comprising:

assuring at least once message delivery of the new message from the cursor to the message consumer, including:

wherein receiving the deletion request from the message consumer comprises receiving the deletion request subsequent to the message consumer completely processing the message.

7. The method as recited in claim 4, further comprising:

assuring at best effort delivery of the new message from the cursor to the message consumer, including:

wherein receiving a deletion request comprises receiving the deletion request along with the lock request prior to the message consumer completely processing the message.

8. The method as recited in claim 4, wherein receiving a deletion request from the message consumer comprises receiving a delete request that identifies the next sequence number and a transaction ID, the transaction ID identifying a transaction that the cursor can enlist in to delete the message in conjunction with completed processing of new message.

9. The method as recited in claim 8, further comprising:
assuring durable exactly once message delivery of the new message from the cursor to the message consumer, including:
enlisting in the transaction based on the transaction ID;
preparing to update the current reads sequence number to the value of the next sequence number in response to the deletion request; and
wherein updating the current read sequence number to the value of the next sequence number comprising committing the transaction to update the current read sequence number to the value of the next sequence number.

10. The method as recited in claim 1, further comprising:
sending an acknowledgement to the upstream systems, the acknowledgement including a further sequence number, the acknowledgment indicating to the message log that all sequence numbers prior to the further sequence number, including the next sequence number, have been deleted from the point of view of the cursor.

11. The method as recited in claim 10, further comprising:
updating a base sequence number to the value of the further sequence number, the base sequence number representing the low watermark of messages the cursor might request, sequence numbers below the further sequence number being numbers that the cursor is not to request.

12. The method as recited in claim 1, further comprising:
the cursor including a duplicate detection algorithm, the duplicate detection algorithm configured to delete received duplicate copies of messages.

13. The method as recited in claim 1, further comprising:
maintaining a low watermark sequence number to indicate that messages with sequence numbers less than the low watermark sequence number were deleted from the cursor's point of view;
sending a ranged acknowledgement including the low watermark sequence number to upstream systems, the ranged acknowledgement indicating that the cursor will never be interested in messages with a sequence number lower than the low watermark sequence number.

14. In a componentized messaging system including a sending computer system with a message log, a second different receiving computer system with a cursor, and a computer network, wherein the sending computer system and the receiving computer system are connected to the network, the componentized message system for delivering messages from a message producer to a message consumer, the message log for capturing messages for delivery to the message consumer, the cursor maintaining message state for the message consumer such that message consumer state is maintained separate from the sending computer system, a method for maintaining message consumer state at the cursor, the method comprising:
receiving a request for a message from the message consumer;
in response to receiving the request for a message from the message consumer:
referring to a current read sequence number, the current sequence read number corresponding to the last message that the message consumer delivered to the message consumer;
sending a request for a next message to the message log, the request including the current read sequence number to indicate to the message log that the cursor last received the message corresponding to the current read sequence number from the message log;
receiving a new message and a next sequence number from the message log, the next sequence number corresponding to the new message within the message log, the next sequence number being a sequence number after the current read sequence number;
sending the new message to the message consumer;
messaging operations failing at a component selected from among the cursor and the message consumer prior to updating the current read sequence number to the value of the next sequence number;
messaging operations returning at the failed component subsequent to the messaging operations failing;
receiving an additional request for a message from the message consumer subsequent to messaging operations returning;
again sending the new message to the message consumer in response to the additional request;
receiving a deletion request from the message consumer, the deletion request requesting deletion of the new message; and
updating the current read sequence number to the value of the next sequence number in response to the deletion request.

15. The method as recited in claim 14, further comprising:
aborting a transaction to delete the new message in response to messaging operations failing at a component selected from among the cursor and the message consumer; and
the message consumer rolling back any processing based on the new message in response to the aborting the transaction such that the message consumer returns to a prior state from before the new message was received, rolling back occurring prior to sending the additional request for a message.

16. The method as recited in claim 14, wherein the again sending the new message to the message consumer comprises sending the message from durable storage at the cursor to the message consumer.

17. The method as recited in claim 14, further comprising subsequent to receiving the additional request and prior to again sending the new message to the message consumer:
in response to receiving the additional request for a message from the message consumer:
again reestablishing the value of the current read sequence number from durable state at the cursor such that the current read sequence number corresponds to the last message that was deleted from the cursor's perspective;
sending another request for a next message to the message log, the request including the current reads sequence number to indicate to the message log that the cursor last received the message corresponding to the current read sequence number from the message log; and
again receiving the new message and the next sequence number from the message log.

18. The method as recited in claim 17, wherein again referring to the current read sequence number comprises referring to a message delete entry in a state table in durable storage to reestablish the current reads sequence number.

19. A componentized messaging system for delivering messages from a message producer to a message consumer, the componentized message system comprising:
- a sending computer system, the sending computer system comprising:
  - one or more processors;
  - system memory; and
  - a message log, the message log configured to accumulate messages from the message producer, in accordance with a message retention policy, from delivery to the message consumer;
- a receiving computer system, the receiving computer system comprising:
  - one or more processors;
  - system memory; and
  - a cursor;
- a computer network, wherein the sending computer system and receiving computer are connected to the network; and
  - wherein the receiving computer system further comprises one or more computer storage media having stored thereon computer-executable instructions for implementing a method for maintaining message consumer state at the cursor, the computer-executed instructions, when executed at one or more of the processors of the sending computer system, causing the receiving computer system to perform the method, the method comprising:
    - receiving a request for a message from the message consumer;
    - in response to receiving the request for a message from the message consumer:
      - referring to a current read sequence number, the current read sequence number corresponding to the last message that the message consumer instructed the cursor to delete;
      - sending a request for a next message to the message log, the request including the current read sequence number to indicate to the message log that the cursor last received the message corresponding to the current read sequence number from the message log;
      - receiving a new message and a next sequence number from the message log, the next sequence number corresponding to the new message within the message log, the next sequence number being a sequence number after the current read sequence number;
      - delivering the new message to the message consumer;
      - receiving a deletion request from the message consumer, the deletion request requesting deletion of the new message; and
      - updating the current read sequence number to the value of the next sequence number.

20. The componentized messaging system of claim 19, wherein the computer-executable instructions further comprise computer-executable instructions that when executed at one or more of the processors of the receiving computer system, cause the sending computer system to send an acknowledgement to the message log, the acknowledgement including a further sequence number, the acknowledgment indicating to the message log that all sequence numbers prior to the further sequence number, including the next sequence number, have been deleted at the cursor.

\* \* \* \* \*